United States Patent
Yu et al.

(10) Patent No.: US 12,445,062 B2
(45) Date of Patent: Oct. 14, 2025

(54) BIPOLAR POWER SUPPLY SYSTEM AND CONTROL METHOD

(71) Applicant: Huawei Digital Power Technologies Co., Ltd., Shenzhen (CN)

(72) Inventors: Xinyu Yu, Shanghai (CN); Kai Xin, Shanghai (CN)

(73) Assignee: Huawei Digital Power Technologies Co., Ltd., Shenzhen (CN)

(*) Notice: Subject to any disclaimer, the term of this patent is extended or adjusted under 35 U.S.C. 154(b) by 231 days.

(21) Appl. No.: 18/476,615

(22) Filed: Sep. 28, 2023

(65) Prior Publication Data

US 2024/0022072 A1  Jan. 18, 2024

Related U.S. Application Data

(63) Continuation of application No. PCT/CN2021/084085, filed on Mar. 30, 2021.

(51) Int. Cl.
*H02M 7/49* (2007.01)
*H02J 1/08* (2006.01)
*H02J 3/38* (2006.01)
*H02M 1/00* (2006.01)

(52) U.S. Cl.
CPC ............ *H02M 7/49* (2013.01); *H02J 1/08* (2013.01); *H02J 3/38* (2013.01); *H02M 1/007* (2021.05)

(58) Field of Classification Search
CPC .. H02M 7/49; H02M 1/007; H02J 1/08; H02J 3/38
See application file for complete search history.

(56) References Cited

U.S. PATENT DOCUMENTS

| | | | |
|---|---|---|---|
| 2016/0036221 A1* | 2/2016 | Pan | H02J 3/381 307/52 |
| 2016/0241153 A1* | 8/2016 | Abeyasekera | H02M 1/12 |
| 2022/0200290 A1* | 6/2022 | Zhang | H02M 7/48 |

FOREIGN PATENT DOCUMENTS

| | | |
|---|---|---|
| CN | 103956727 A | 7/2014 |
| CN | 104065287 A | 9/2014 |
| CN | 104218609 A | 12/2014 |
| CN | 105515034 A | 4/2016 |
| CN | 206099366 U | 4/2017 |
| CN | 105811449 B | 7/2018 |
| CN | 111433995 A | 7/2020 |
| WO | 2020038805 A1 | 2/2020 |

* cited by examiner

*Primary Examiner* — Harry R Behm
(74) *Attorney, Agent, or Firm* — Slater Matsil, LLP

(57) ABSTRACT

A voltage conversion unit includes a positive voltage conversion apparatus and a negative voltage conversion apparatus. The inverter unit includes a positive inverter and a negative inverter. A negative output end of the positive voltage conversion apparatus and a positive output end of the negative voltage conversion apparatus are connected to a first end of a neutral wire, and a negative input end of the positive inverter and a positive input end of the negative inverter are connected to a second end of the neutral wire. When the neutral wire current does not meet the preset current range, the controller control the positive voltage conversion apparatus and the negative voltage conversion apparatus to change output voltages when output power remains unchanged, so that the neutral wire current meets the preset current range.

20 Claims, 7 Drawing Sheets

BIPOLAR POWER SUPPLY SYSTEM AND CONTROL METHOD

CROSS-REFERENCE TO RELATED APPLICATIONS

This application is a continuation of International Application No. PCT/CN2021/084085, filed on Mar. 30, 2021, the disclosure of which is hereby incorporated by reference in its entirety.

TECHNICAL FIELD

This application relates to the field of circuit technologies, and more specifically, to a bipolar power supply system and a control method.

BACKGROUND

In the field of direct current power supply, a system architecture for remote power supply includes a unipolar power supply system and a bipolar power supply system. If the bipolar power supply system is used, a direct current voltage level can be equivalently improved, and a power supply current can be decreased, to decrease a line loss. However, there is a unique neutral wire current problem in the bipolar power supply system. If a neutral wire current is not effectively controlled, the neutral wire current may exceed a cable specification, affecting system reliability. In an existing solution for controlling the neutral wire current, the neutral wire current usually needs to be controlled by adjusting output power of a positive voltage conversion apparatus and output power of a negative voltage conversion apparatus in the bipolar power supply system. However, in some new energy power supply scenarios, for example, in a wind power system and a photovoltaic system, the positive voltage conversion apparatus and the negative voltage conversion apparatus differ in maximum output power. If the output power of the positive voltage conversion apparatus and the output power of the negative voltage conversion apparatus are limited, the power supply system cannot provide maximum output power. Consequently, an energy yield is affected, and an additional economic loss is caused. Therefore, a method for controlling the neutral wire current needs to be urgently provided in the industry, to improve management efficiency of controlling the neutral wire current.

SUMMARY

According to a first aspect, a bipolar power supply system is provided, and includes a voltage conversion unit, an inverter unit, and a controller. The voltage conversion unit is configured to: receive electric energy provided by a power generation module, and output a direct current to the inverter unit after performing direct current conversion. The inverter unit is configured to: convert the direct current into an alternating current, and output the alternating current to a power grid. The voltage conversion unit includes a positive voltage conversion apparatus and a negative voltage conversion apparatus. The inverter unit includes a positive inverter and a negative inverter. A negative output end of the positive voltage conversion apparatus and a positive output end of the negative voltage conversion apparatus are connected to a first end of a neutral wire, and a negative input end of the positive inverter and a positive input end of the negative inverter are connected to a second end of the neutral wire. The controller is configured to: detect whether a neutral wire current meets a preset current range, where the neutral wire current is a current passing through the neutral wire; and control, when the neutral wire current does not meet the preset current range, the positive voltage conversion apparatus and the negative voltage conversion apparatus to change output voltages when output power remains unchanged, so that the neutral wire current meets the preset current range.

The controller may control the positive voltage conversion apparatus and the negative voltage conversion apparatus to change the output voltages when the output power remains unchanged, to decrease the neutral wire current. In this manner of adjusting the neutral wire current, the output power of the voltage conversion apparatus is kept unchanged, so that it is ensured that the power supply system can provide maximum output power and provide a larger energy yield. While adjusting the neutral wire current, this improves power generation efficiency of the power supply system, and avoids an additional economic loss.

With reference to the first aspect, in a possible implementation, the preset current range is $[-I_{t1}, I_{t2}]$, $-I_{t1}$ represents a first preset current threshold, $I_{t2}$ represents a second preset current threshold, a direction of the neutral wire current is from the inverter unit to the voltage conversion unit, a positive direction of the current range is from the inverter unit to the voltage conversion unit, a negative direction of the current range is from the voltage conversion unit to the inverter unit, and the controller is specifically configured to: determine that the neutral wire current is greater than $I_{t2}$; and control the positive voltage conversion apparatus and the negative voltage conversion apparatus to increase a voltage difference between the output voltage of the positive voltage conversion apparatus and the output voltage of the negative voltage conversion apparatus when the output power remains unchanged, so that the neutral wire current falls within an interval $[-I_{t1}, I_{t2}]$.

When the neutral wire current is greater than $I_{t2}$, the controller controls the positive voltage conversion apparatus and the negative voltage conversion apparatus to increase the voltage difference between the output voltage of the positive voltage conversion apparatus and the output voltage of the negative voltage conversion apparatus when the output power remains unchanged, to decrease the neutral wire current. In this manner of adjusting the neutral wire current, the output power of the voltage conversion apparatus is kept unchanged, so that it is ensured that the power supply system can provide maximum output power and provide a larger energy yield. While adjusting the neutral wire current, this improves power generation efficiency of the power supply system, and avoids an additional economic loss.

With reference to the first aspect, in a possible implementation, the preset current range is $[-I_{t1}, I_{t2}]$, $-I_{t1}$ represents a first preset current threshold, $I_{t2}$ represents a second preset current threshold, a direction of the neutral wire current is from the inverter unit to the voltage conversion unit, a positive direction of the current range is from the inverter unit to the voltage conversion unit, a negative direction of the current range is from the voltage conversion unit to the inverter unit, and the controller is specifically configured to: determine that the neutral wire current is less than $-I_{t1}$; and control the positive voltage conversion apparatus and the negative voltage conversion apparatus to decrease a voltage difference between the output voltage of the positive voltage conversion apparatus and the output voltage of the negative voltage conversion apparatus when the output power remains unchanged, so that the neutral wire current falls within an interval $[-I_{t1}, I_{t2}]$.

When the neutral wire current is less than $-I_{t1}$, the controller controls the positive voltage conversion apparatus and the negative voltage conversion apparatus to decrease the voltage difference between the output voltage of the positive voltage conversion apparatus and the output voltage of the negative voltage conversion apparatus when the output power remains unchanged, to decrease the neutral wire current. In this manner of adjusting the neutral wire current, the output power of the voltage conversion apparatus is kept unchanged, so that it is ensured that the power supply system can provide maximum output power and provide a larger energy yield. While adjusting the neutral wire current, this improves power generation efficiency of the power supply system, and avoids an additional economic loss.

With reference to the first aspect, in a possible implementation, the controller includes a first control unit disposed in the positive voltage conversion apparatus and a second control unit disposed in the negative voltage conversion apparatus; the first control unit is specifically configured to: when the neutral wire current is greater than $I_{t2}$, control the positive voltage conversion apparatus to increase the output voltage; and the second control unit is specifically configured to: when the neutral wire current is greater than $I_{t2}$, control the negative voltage conversion apparatus to decrease the output voltage.

The controller may include the first control unit disposed in the positive voltage conversion apparatus and the second control unit disposed in the negative voltage conversion apparatus. The two control units may respectively control the output voltage of the positive voltage conversion apparatus and the output voltage of the negative voltage conversion apparatus, to adjust the voltage difference between the output voltage of the positive voltage conversion apparatus and the output voltage of the negative voltage conversion apparatus. In this manner of adjusting the neutral wire current, the output power of the voltage conversion apparatus is kept unchanged, so that it is ensured that the power supply system can provide maximum output power and provide a larger energy yield. While adjusting the neutral wire current, this improves power generation efficiency of the power supply system, and avoids an additional economic loss.

With reference to the first aspect, in a possible implementation, the controller includes a first control unit disposed in the positive voltage conversion apparatus and a second control unit disposed in the negative voltage conversion apparatus; the first control unit is specifically configured to: when the neutral wire current is greater than $I_{t2}$, control the positive voltage conversion apparatus to increase the output voltage; and the second control unit is specifically configured to: when the neutral wire current is greater than $I_{t2}$, control the output voltage of the negative voltage conversion apparatus to remain unchanged.

With reference to the first aspect, in a possible implementation, the controller includes a first control unit disposed in the positive voltage conversion apparatus and a second control unit disposed in the negative voltage conversion apparatus; the first control unit is specifically configured to: when the neutral wire current is greater than $I_{t2}$, control the output voltage of the positive voltage conversion apparatus to remain unchanged; and the second control unit is specifically configured to: when the neutral wire current is greater than $I_{t2}$, control the negative voltage conversion apparatus to decrease the output voltage.

With reference to the first aspect, in a possible implementation, the controller is further configured to determine whether the output voltage of the positive voltage conversion apparatus is greater than a first preset voltage threshold, where the first preset voltage threshold is an adjustable upper limit value of the output voltage of the positive voltage conversion apparatus; and the controller is specifically configured to: when the neutral wire current is greater than $I_{t2}$, and the output voltage of the positive voltage conversion apparatus is less than the first preset voltage threshold, control the positive voltage conversion apparatus and the negative voltage conversion apparatus to increase the voltage difference between the output voltage of the positive voltage conversion apparatus and the output voltage of the negative voltage conversion apparatus when the output power remains unchanged, so that the neutral wire current falls within the interval $[-I_{t1}, I_{t2}]$; or the controller is further configured to: when the neutral wire current is greater than $I_{t2}$, and the output voltage of the positive voltage conversion apparatus is greater than or equal to the first preset voltage threshold, control the positive voltage conversion apparatus to decrease the output power.

In a process of adjusting the neutral wire current, if the output voltage of the positive voltage conversion apparatus reaches the adjustable upper limit value of the output voltage, for example, the first preset voltage threshold, the controller needs to control the positive voltage conversion apparatus to decrease the power, to adjust a range of the neutral wire current, so as to improve management efficiency of controlling the neutral wire current.

With reference to the first aspect, in a possible implementation, the controller includes a first control unit disposed in the positive voltage conversion apparatus and a second control unit disposed in the negative voltage conversion apparatus; the first control unit is specifically configured to: when the neutral wire current is less than $-I_{t1}$, control the positive voltage conversion apparatus to decrease the output voltage; and the second control unit is specifically configured to: when the neutral wire current is less than $-I_{t1}$, control the negative voltage conversion apparatus to increase the output voltage.

With reference to the first aspect, in a possible implementation, the controller includes a first control unit disposed in the positive voltage conversion apparatus and a second control unit disposed in the negative voltage conversion apparatus; the first control unit is specifically configured to: when the neutral wire current is less than $-I_{t1}$, control the positive voltage conversion apparatus to decrease the output voltage; and the second control unit is specifically configured to: when the neutral wire current is less than $-I_{t1}$, control the output voltage of the negative voltage conversion apparatus to remain unchanged.

With reference to the first aspect, in a possible implementation, the controller includes a first control unit disposed in the positive voltage conversion apparatus and a second control unit disposed in the negative voltage conversion apparatus; the first control unit is specifically configured to: when the neutral wire current is less than $-I_{t1}$, control the output voltage of the positive voltage conversion apparatus to remain unchanged; and the second control unit is specifically configured to: when the neutral wire current is less than $-I_{t1}$, control the negative voltage conversion apparatus to increase the output voltage.

With reference to the first aspect, in a possible implementation, the controller is further configured to determine whether the output voltage of the negative voltage conversion apparatus is greater than a second preset voltage threshold, where the second preset voltage threshold is an adjustable upper limit value of the output voltage of the negative voltage conversion apparatus; and the controller is specifically configured to: when the neutral wire current is less than $-I_{t1}$, and the output voltage of the negative voltage conversion apparatus is less than the second preset voltage threshold, control the positive voltage conversion apparatus and the negative voltage conversion apparatus to decrease the voltage difference between the output voltage of the positive voltage conversion apparatus and the output voltage of the negative voltage conversion apparatus when the output power remains unchanged, so that the neutral wire current falls within the interval $[-I_{t1}, I_{t2}]$; or the controller is further configured to: when the neutral wire current is less than $-I_{t1}$, and the output voltage of the negative voltage conversion apparatus is greater than or equal to the second preset voltage threshold, control the negative voltage conversion apparatus to decrease the output power.

In a process of adjusting the neutral wire current, if the output voltage of the negative voltage conversion apparatus reaches the adjustable upper limit value of the output voltage, for example, the second preset voltage threshold, the controller needs to control the negative voltage conversion apparatus to decrease the power, to adjust a range of the neutral wire current, so as to improve management efficiency of controlling the neutral wire current.

According to a second aspect, a control method for a bipolar power supply system is provided. The bipolar power supply system includes a voltage conversion unit, an inverter unit, and a controller. The voltage conversion unit is configured to: receive electric energy provided by a power generation module, and output a direct current to the inverter unit after performing direct current conversion. The inverter unit is configured to: convert the direct current into an alternating current, and output the alternating current to a power grid. The voltage conversion unit includes a positive voltage conversion apparatus and a negative voltage conversion apparatus. The inverter unit includes a positive inverter and a negative inverter. A negative output end of the positive voltage conversion apparatus and a positive output end of the negative voltage conversion apparatus are connected to a first end of a neutral wire, and a negative input end of the positive inverter and a positive input end of the negative inverter are connected to a second end of the neutral wire. The method includes: The controller detects whether a neutral wire current meets a preset current range, where the neutral wire current is a current passing through the neutral wire; and the controller controls, when the neutral wire current does not meet the preset current range, the positive voltage conversion apparatus and the negative voltage conversion apparatus to change output voltages when output power remains unchanged, so that the neutral wire current meets the preset current range.

With reference to the second aspect, in a possible implementation, the preset current range is $[-I_{t1}, I_{t2}]$, $-I_{t1}$ represents a first preset current threshold, $I_{t2}$ represents a second preset current threshold, a direction of the neutral wire current is from the inverter unit to the voltage conversion unit, a positive direction of the current range is from the inverter unit to the voltage conversion unit, and a negative direction of the current range is from the voltage conversion unit to the inverter unit; and that the controller controls, when the neutral wire current does not meet the preset current range, the positive voltage conversion apparatus and the negative voltage conversion apparatus to change output voltages when output power remains unchanged includes: The controller determines that the neutral wire current is greater than $I_{t2}$; and the controller controls the positive voltage conversion apparatus and the negative voltage conversion apparatus to increase a voltage difference between the output voltage of the positive voltage conversion apparatus and the output voltage of the negative voltage conversion apparatus when the output power remains unchanged, so that the neutral wire current falls within an interval $[-I_{t1}, I_{t2}]$.

With reference to the second aspect, in a possible implementation, the preset current range is $[-I_{t1}, I_{t2}]$, $-I_{t1}$ represents a first preset current threshold, $I_{t2}$ represents a second preset current threshold, a direction of the neutral wire current is from the inverter unit to the voltage conversion unit, a positive direction of the current range is from the inverter unit to the voltage conversion unit, a negative direction of the current range is from the voltage conversion unit to the inverter unit, and when the neutral wire current does not meet the preset current range, the positive voltage conversion apparatus and the negative voltage conversion apparatus to change output voltages when output power remains unchanged includes: The controller determines that the neutral wire current is less than $-I_{t1}$; and the controller controls the positive voltage conversion apparatus and the negative voltage conversion apparatus to decrease a voltage difference between the output voltage of the positive voltage conversion apparatus and the output voltage of the negative voltage conversion apparatus when the output power remains unchanged, so that the neutral wire current falls within an interval $[-I_{t1}, I_{t2}]$.

With reference to the second aspect, in a possible implementation, the controller includes a first control unit disposed in the positive voltage conversion apparatus and a second control unit disposed in the negative voltage conversion apparatus, and that the controller controls, when detecting that the neutral wire current is greater than $I_{t2}$, the positive voltage conversion apparatus and the negative voltage conversion apparatus to increase a voltage difference between the output voltage of the positive voltage conversion apparatus and the output voltage of the negative voltage conversion apparatus when the output power remains unchanged includes: When it is detected that the neutral wire current is greater than $I_{t2}$, the first control unit controls the positive voltage conversion apparatus to increase the output voltage; and when it is detected that the neutral wire current is greater than $I_{t2}$, the second control unit controls the negative voltage conversion apparatus to decrease the output voltage.

With reference to the second aspect, in a possible implementation, the controller includes a first control unit disposed in the positive voltage conversion apparatus and a second control unit disposed in the negative voltage conversion apparatus, and that the controller controls, when detecting that the neutral wire current is greater than $I_{t2}$, the positive voltage conversion apparatus and the negative voltage conversion apparatus to increase a voltage difference between the output voltage of the positive voltage conversion apparatus and the output voltage of the negative voltage conversion apparatus when the output power remains unchanged includes: When it is detected that the neutral wire current is greater than $I_{t2}$, the first control unit controls the positive voltage conversion apparatus to increase the output voltage; and when it is detected that the neutral wire current is greater than $I_{t2}$, the second control unit controls the output voltage of the negative voltage conversion apparatus to remain unchanged.

With reference to the second aspect, in a possible implementation, the controller includes a first control unit disposed in the positive voltage conversion apparatus and a second control unit disposed in the negative voltage conversion apparatus, and that the controller controls, when detecting that the neutral wire current is greater than $I_{r2}$, the positive voltage conversion apparatus and the negative voltage conversion apparatus to increase a voltage difference between the output voltage of the positive voltage conversion apparatus and the output voltage of the negative voltage conversion apparatus when the output power remains unchanged includes: When it is detected that the neutral wire current is greater than $I_{r2}$, the first control unit controls the output voltage of the positive voltage conversion apparatus to remain unchanged; and when it is detected that the neutral wire current is greater than $I_{r2}$, the second control unit controls the negative voltage conversion apparatus to decrease the output voltage.

With reference to the second aspect, in a possible implementation, the method further includes: The controller determines whether the output voltage of the positive voltage conversion apparatus is greater than a first preset voltage threshold, where the first preset voltage threshold is an adjustable upper limit value of the output voltage of the positive voltage conversion apparatus; and that the controller controls the positive voltage conversion apparatus and the negative voltage conversion apparatus to increase a voltage difference between the output voltage of the positive voltage conversion apparatus and the output voltage of the negative voltage conversion apparatus when the output power remains unchanged includes: When the neutral wire current is greater than $I_{r2}$, and the output voltage of the positive voltage conversion apparatus is less than the first preset voltage threshold, the controller controls the positive voltage conversion apparatus and the negative voltage conversion apparatus to increase the voltage difference between the output voltage of the positive voltage conversion apparatus and the output voltage of the negative voltage conversion apparatus when the output power remains unchanged, so that the neutral wire current falls within the interval $[-I_{r1}, I_{r2}]$; or the method further includes: When the neutral wire current is greater than $I_{r2}$, and the output voltage of the positive voltage conversion apparatus is greater than or equal to the first preset voltage threshold, the controller controls the positive voltage conversion apparatus to decrease the output power.

With reference to the second aspect, in a possible implementation, the controller includes a first control unit disposed in the positive voltage conversion apparatus and a second control unit disposed in the negative voltage conversion apparatus, and that the controller controls, when detecting that the neutral wire current is less than $-I_{r1}$, the positive voltage conversion apparatus and the negative voltage conversion apparatus to decrease a voltage difference between the output voltage of the positive voltage conversion apparatus and the output voltage of the negative voltage conversion apparatus when the output power remains unchanged includes: When it is detected that the neutral wire current is less than $-I_{r1}$, the first control unit controls the positive voltage conversion apparatus to decrease the output voltage; and when it is detected that the neutral wire current is less than $-I_{r1}$, the second control unit controls the negative voltage conversion apparatus to increase the output voltage.

With reference to the second aspect, in a possible implementation, the controller includes a first control unit disposed in the positive voltage conversion apparatus and a second control unit disposed in the negative voltage conversion apparatus, and that the controller controls, when detecting that the neutral wire current is less than $-I_{r1}$, the positive voltage conversion apparatus and the negative voltage conversion apparatus to decrease a voltage difference between the output voltage of the positive voltage conversion apparatus and the output voltage of the negative voltage conversion apparatus when the output power remains unchanged includes: When it is detected that the neutral wire current is less than $-I_{r1}$, the first control unit controls the positive voltage conversion apparatus to decrease the output voltage; and when it is detected that the neutral wire current is less than $-I_{r1}$, the second control unit controls the output voltage of the negative voltage conversion apparatus to remain unchanged.

With reference to the second aspect, in a possible implementation, the controller includes a first control unit disposed in the positive voltage conversion apparatus and a second control unit disposed in the negative voltage conversion apparatus, and that the controller controls, when detecting that the neutral wire current is less than $-I_{r1}$, the positive voltage conversion apparatus and the negative voltage conversion apparatus to decrease a voltage difference between the output voltage of the positive voltage conversion apparatus and the output voltage of the negative voltage conversion apparatus when the output power remains unchanged includes: When it is detected that the neutral wire current is less than $-I_{r1}$, the first control unit controls the output voltage of the positive voltage conversion apparatus to remain unchanged; and when it is detected that the neutral wire current is less than $-I_{r1}$, the second control unit controls the negative voltage conversion apparatus to increase the output voltage.

With reference to the second aspect, in a possible implementation, the method further includes: The controller determines whether the output voltage of the negative voltage conversion apparatus is greater than a second preset voltage threshold, where the second preset voltage threshold is an adjustable upper limit value of the output voltage of the negative voltage conversion apparatus; and that the controller controls the positive voltage conversion apparatus and the negative voltage conversion apparatus to decrease a voltage difference between the output voltage of the positive voltage conversion apparatus and the output voltage of the negative voltage conversion apparatus when the output power remains unchanged includes: When the neutral wire current is less than $-I_{r1}$, and the output voltage of the negative voltage conversion apparatus is less than the second preset voltage threshold, the controller controls the positive voltage conversion apparatus and the negative voltage conversion apparatus to decrease the voltage difference between the output voltage of the positive voltage conversion apparatus and the output voltage of the negative voltage conversion apparatus when the output power remains unchanged, so that the neutral wire current falls within the interval $[-I_{r1}, I_{r2}]$; or the method further includes: When the neutral wire current is less than $-I_{r1}$, and the output voltage of the negative voltage conversion apparatus is greater than or equal to the second preset voltage threshold, the controller controls the negative voltage conversion apparatus to decrease the output power.

According to a third aspect, a control device for a bipolar power supply system is provided. The bipolar power supply system includes a voltage conversion unit and an inverter unit. The voltage conversion unit is configured to: receive electric energy provided by a power generation module, and output a direct current to the inverter unit after performing direct current conversion. The inverter unit is configured to:

convert the direct current into an alternating current, and output the alternating current to a power grid. The voltage conversion unit includes a positive voltage conversion apparatus and a negative voltage conversion apparatus. The inverter unit includes a positive inverter and a negative inverter. A negative output end of the positive voltage conversion apparatus and a positive output end of the negative voltage conversion apparatus are connected to a first end of a neutral wire, and a negative input end of the positive inverter and a positive input end of the negative inverter are connected to a second end of the neutral wire. The control device is configured to perform the method according to any one of the second aspect or the possible implementations of the second aspect.

According to a fourth aspect, a device for a bipolar power supply system is provided. The device includes the control device according to the third aspect. The device may be a voltage conversion unit or an inverter unit.

DETAILED DESCRIPTION OF ILLUSTRATIVE EMBODIMENTS

The following describes technical solutions in this application with reference to the accompanying drawings.

Figure 1:
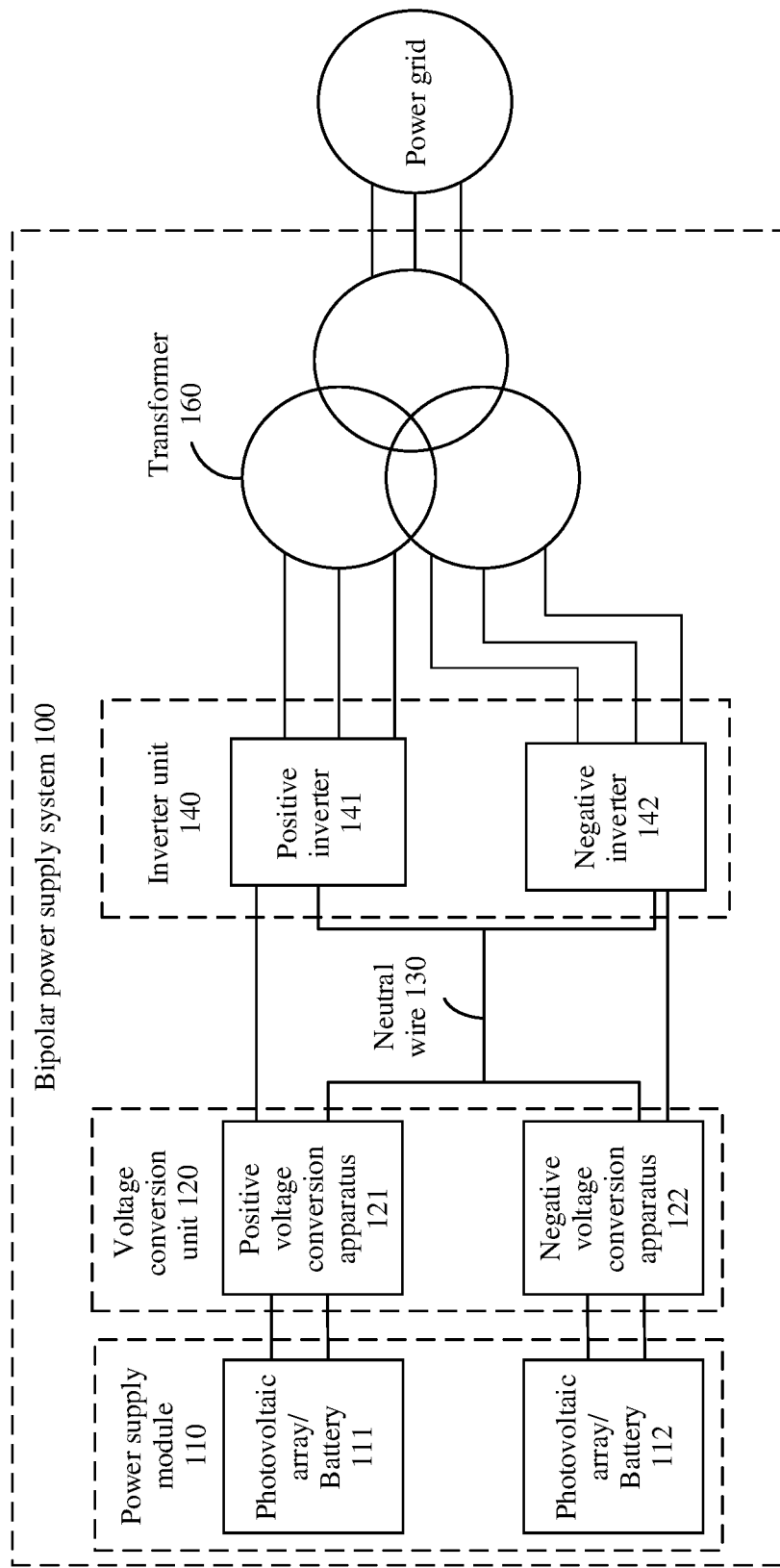
FIG. 1 is a schematic diagram of a bipolar power supply system 100 applicable to an embodiment of this application.

For ease of understanding embodiments of this application, an application scenario of this application is first described with reference to FIG. 1. FIG. 1 is a schematic diagram of a bipolar power supply system 100 according to an embodiment of this application. As shown in FIG. 1, the bipolar power supply system 100 can generate electric energy, and provide the generated electric energy to a power grid for power supply. Specifically, the bipolar power supply system 100 may include a power supply module 110, a voltage conversion unit 120, and an inverter unit 140. The voltage conversion unit 120 may include a positive voltage conversion apparatus 121 and a negative voltage conversion apparatus 122. The inverter unit 140 may include a positive inverter 141 and a negative inverter 142. A negative output end of the positive voltage conversion apparatus 121 and a positive output end of the negative voltage conversion apparatus 122 are connected to a first end of a neutral wire 130, and a negative input end of the positive inverter 141 and a positive input end of the negative inverter 142 are connected to a second end of the neutral wire 130. In addition, a positive output end of the positive voltage conversion apparatus 121 is connected to a positive input end of the positive inverter 141, and a negative output end of the negative voltage conversion apparatus 122 is connected to a negative input end of the negative inverter 142.

The power supply module 110 may output the generated electric energy to the voltage conversion unit 120. The voltage conversion unit 120 may supply power to the inverter unit 140 after performing direct current voltage conversion. The inverter unit 140 may receive electric energy transmitted by the voltage conversion unit 120, and supply power to the power grid after performing direct current-to-alternating current voltage conversion. For example, the power supply module no that provides electric energy may include but is not limited to the following: a photovoltaic (PV) array in and a battery 112. The system in FIG. 1 is merely intended to describe an application scenario of embodiments of this application, and is not intended to limit this application.

Optionally, the bipolar power supply system 100 in FIG. 1 may further include a transformer 160. The transformer 160 is configured to: receive an alternating current output by the inverter unit 140, perform voltage conversion on the alternating current, and input the alternating current to the power grid. Alternating currents output by the positive inverter 141 and the negative inverter 142 may be respectively applied to different windings in the inverter unit 140.

It should be understood that a connection relationship of a circuit is not limited in this embodiment of this application. In actual application, another device may be further connected between components in FIG. 1. For example, a filter unit may be further disposed between the inverter unit 140 and the transformer 160, to filter a voltage output by the inverter unit 140 and then input the voltage to the transformer 160. This is not limited in this application.

It should be understood that FIG. 1 is merely an example for describing the application scenario of embodiments of this application. In practice, the application scenario used in this application may be appropriately modified. For example, the application scenario may include more or fewer functional modules, devices, and units than those in FIG. 1, and all the functional modules, devices, and units fall within the protection scope of embodiments of this application.

It should be understood that in this application, the power supply module no may include the photovoltaic array in and a photovoltaic array 112, or may include a battery in and the battery 112. In this case, the power supply module no and the voltage conversion unit 120 jointly form a power storage system. Electric energy generated by the power supply module no and the voltage conversion unit 120 is transmitted to the inverter unit 140. The electric energy is processed by the inverter unit 140, to obtain an alternating current, and the alternating current is provided to the power grid. It should be understood that in an application scenario of the bipolar power supply system, the battery 111 or the battery 112 stores electric energy. When power needs to be supplied to the power grid, the voltage conversion unit 120 may perform voltage conversion on the electric energy stored in the battery 111 or the battery 112, to output a direct current, and then transmit the direct current to the inverter unit 140. The direct current is processed by the inverter unit 140, to obtain an alternating current, and the alternating current is provided to the power grid.

The voltage conversion unit 120 may include a buck converter, a boost converter, a buck-boost converter, or a boost-buck converter. The voltage conversion unit 120 may be isolated or non-isolated.

In addition, the positive voltage conversion apparatus 121 that performs direct current voltage conversion on the photovoltaic array in and the negative voltage conversion apparatus 122 that performs direct current voltage conversion on the photovoltaic array 112 may be the same or different. Specific topologies of the positive voltage conversion apparatus 121 and the negative voltage conversion apparatus 122 are determined based on an actual circuit status. The topologies of the positive voltage conversion apparatus and the negative voltage conversion apparatus are not limited in this application. In this application, the positive voltage conversion apparatus 121 and the negative voltage conversion apparatus 122 may be direct current-to-direct current (DC/DC) converters. The positive inverter 141 and the negative inverter 142 each may include a power conversion system (PCS) or a direct current-to-alternating current (DC/AC) converter.

In the bipolar power supply system 100 shown in FIG. 1, the positive voltage conversion apparatus 121 and the negative voltage conversion apparatus 122 are connected to different photovoltaic arrays. For example, the positive voltage conversion apparatus 121 is connected to the photovoltaic array in, and the negative voltage conversion apparatus 122 is connected to the photovoltaic array 112. When working statuses of the photovoltaic array in and the photovoltaic array 112 are inconsistent, for example, the photovoltaic array in and the photovoltaic array 112 are faulty, there is a light difference, or there is shading, output power of the positive voltage conversion apparatus 121 may be inconsistent with output power of the negative voltage conversion apparatus 122, and a neutral wire current is generated on the neutral wire 130. Due to generation of the current on the neutral wire 130, a loss is increased, and an energy yield is affected. In addition, when the current on the neutral wire 130 exceeds a cable specification, system reliability is affected. To resolve this problem, this application provides a control method for a bipolar power supply system and a bipolar power supply system. The following describes in detail the solutions in embodiments of this application with reference to FIG. 2 to FIG. 6.

Figure 2:
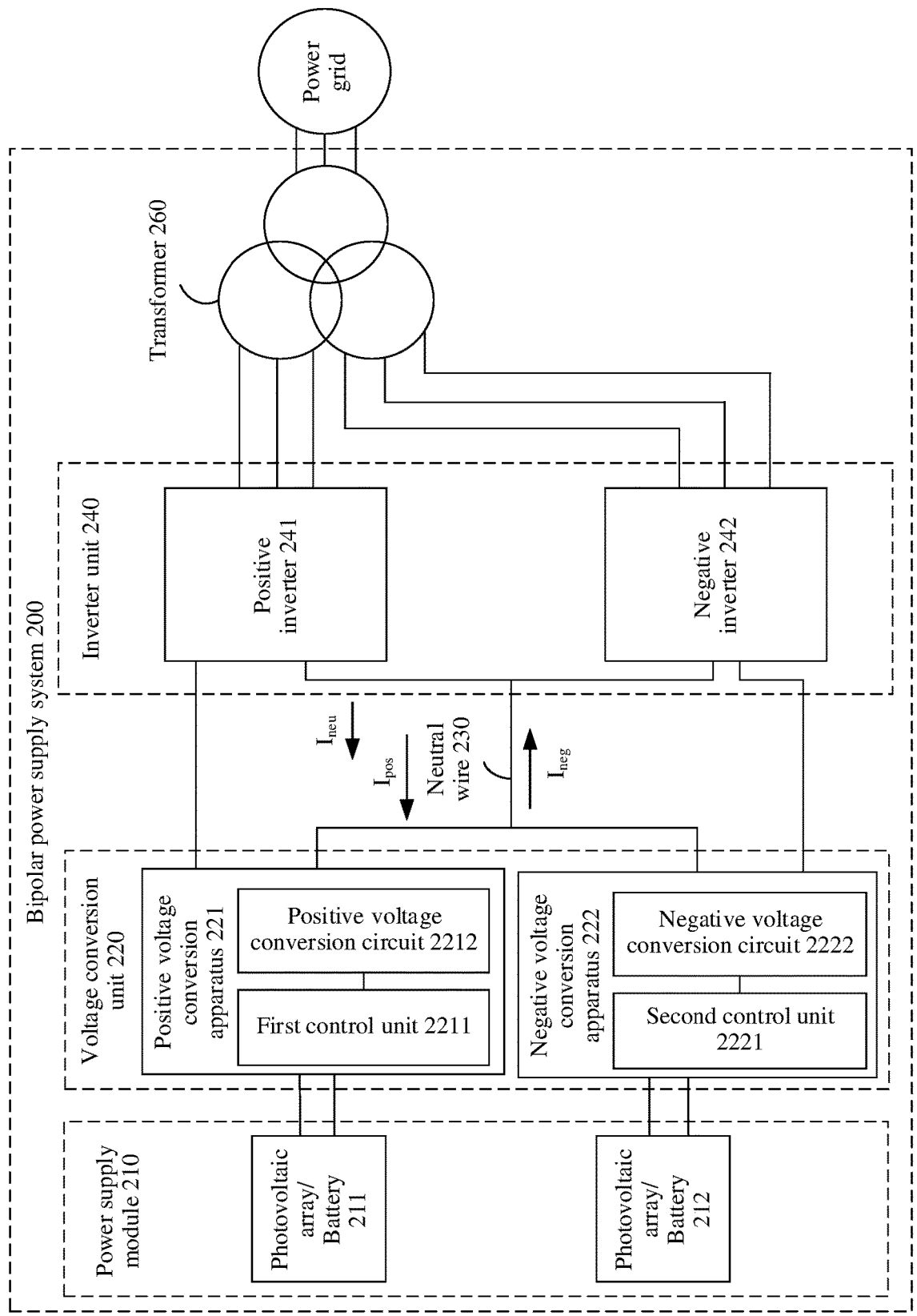
FIG. 2 is a schematic diagram of a structure of a bipolar power supply system 200 according to an embodiment of this application.

FIG. 2 is a schematic diagram of a structure of a bipolar power supply system 200 according to an embodiment of this application. As shown in FIG. 2, the system includes a power supply module 210, a voltage conversion unit 220, an inverter unit 240, a transformer 260, and a controller. The controller may be an independent control unit, or may be a control unit disposed in the bipolar power supply system 200. In addition, the controller may include one independent module, or may include a plurality of modules disposed in different devices, and the plurality of modules may communicate with each other. For example, the controller may be disposed in the voltage conversion unit 220 or disposed in the inverter unit 240. For example, the controller may include a first control unit 2211 and/or a second control unit 2221, and different control units may communicate with each other.

Functions of the power supply module 210 and the transformer 260 are the same as or similar to those of the power supply module no and the transformer 160 in FIG. 1. Details are not described again herein. The voltage conversion unit 220 may include a positive voltage conversion apparatus 221 and a negative voltage conversion apparatus 222. The inverter unit 240 includes a positive inverter 241 and a negative inverter 242. The positive voltage conversion apparatus 221 may include the first control unit 2211 and a positive voltage conversion circuit 2212. The negative voltage conversion apparatus 222 may include the second control unit 2221 and a negative voltage conversion circuit 2222. In other words, the first control unit 2211 is disposed in the positive voltage conversion apparatus 221, and the second control unit is disposed in the negative voltage conversion apparatus 222. A negative output end of the positive voltage conversion apparatus 221 and a positive output end of the negative voltage conversion apparatus 222 are connected to a first end of a neutral wire 230, and a negative input end of the positive inverter 241 and a positive input end of the negative inverter 242 are connected to a second end of the neutral wire 230.

In addition, a positive output end of the positive voltage conversion apparatus 221 is connected to a positive input end of the positive inverter 241, and a negative output end of the negative voltage conversion apparatus 222 is connected to a negative input end of the negative inverter 242.

The first control unit 2211 is configured to control the positive voltage conversion circuit 2212 to receive electric energy provided by the power supply module in the power supply system, and supply power to the inverter unit 240 after performing direct current voltage conversion. The second control unit 2221 is configured to control the negative voltage conversion circuit 2222 to receive electric energy provided by the power supply module in the power supply system, and supply power to the inverter unit 240 after performing direct current voltage conversion. The inverter unit 240 receives electric energy transmitted by the voltage conversion unit 220, and supplies power to a power grid after performing direct current-to-alternating current voltage conversion.

The controller is configured to: detect whether a neutral wire current meets a preset current range; and control, when the neutral wire current does not meet the preset current range, the positive voltage conversion apparatus 221 and the negative voltage conversion apparatus 222 to change output voltages when output power remains unchanged, so that the neutral wire current meets the preset current range.

The preset current range may be determined based on practical experience, for example, determined based on a wire type of the neutral wire 230, or may be determined in another manner. This is not limited in this application. A current in the preset current range may include only one current direction, or may include two current directions. For example, a direction of the current in the preset current range may be from the voltage conversion unit 220 to the inverter unit 240, may be from the inverter unit 240 to the voltage conversion unit 220, or may include the foregoing two current directions, provided that an absolute value of the preset current range is less than a preset threshold.

In an example, the preset current range is $[-I_{t1}, I_{t2}]$, $-I_{t1}$ represents a first preset current threshold, $I_{t2}$ represents a second preset current threshold, a direction of the neutral wire current is from the inverter unit 240 to the voltage conversion unit 220, a positive direction of the current range is from the inverter unit 240 to the voltage conversion unit 220, and a negative direction of the current range is from the voltage conversion unit 220 to the inverter unit 240.

The following describes a principle of adjusting the neutral wire current in this embodiment of this application with reference to a formula (1). The formula (1) is expressed as follows:

$$I_{neu} = I_{pos} - I_{neg} = \frac{P_{pos}}{U_{pos}} - \frac{P_{neg}}{U_{neg}} \qquad (1)$$

Herein, $I_{neu}$ represents the neutral wire current, $I_{pos}$ represents a current output by the positive voltage conversion apparatus 221, $I_{neg}$ represents a current output by the negative voltage conversion apparatus 222, $P_{pos}$ represents the output power of the positive voltage conversion apparatus 221, $U_{pos}$ represents the output voltage of the positive voltage conversion apparatus 221, $P_{neg}$ represents the output power of the negative voltage conversion apparatus 222, and $U_{neg}$ represents the output voltage of the negative voltage conversion apparatus 222.

When $I_{neu}$ is greater than $I_{t2}$, the output voltage $U_{pos}$ of the positive voltage conversion apparatus needs to be increased, or the output voltage $U_{neg}$ of the negative voltage conversion apparatus needs to be decreased, so that $I_{neu}$ is less than $I_{t2}$. That is, a voltage difference between the output voltage of the positive voltage conversion apparatus 221 and the output voltage of the negative voltage conversion apparatus is increased.

When $I_{neu}$ is less than $-I_{t1}$, the output voltage $U_{pos}$ of the positive voltage conversion apparatus needs to be decreased, or the output voltage $U_{neg}$ of the negative voltage conversion apparatus needs to be increased, so that $I_{neu}$ is greater than $-I_{t1}$. That is, a voltage difference between the output voltage of the positive voltage conversion apparatus 221 and the output voltage of the negative voltage conversion apparatus is decreased.

In some examples, when the neutral wire current is greater than $I_{t2}$, the controller controls the positive voltage conversion apparatus 221 and the negative voltage conversion apparatus 222 to increase the voltage difference between the output voltage of the positive voltage conversion apparatus 221 and the output voltage of the negative voltage conversion apparatus 222 when the output power remains unchanged, so that the neutral wire current falls within an interval $[-I_{t1}, I_{t2}]$.

Specifically, when the neutral wire current is less than $-I_{t1}$, the controller controls the positive voltage conversion apparatus 221 and the negative voltage conversion apparatus 222 to decrease the voltage difference between the output voltage of the positive voltage conversion apparatus 221 and the output voltage of the negative voltage conversion apparatus 222 when the output power remains unchanged, so that the neutral wire current falls within an interval $[-I_{t1}, I_{t2}]$.

In some examples, the controller includes the first control unit 2211 and the second control unit 2221. Both the first control unit 2211 and the second control unit 2221 may be configured to detect whether the neutral wire current meets the preset current range.
Alternatively, one of the first control unit 2211 and the second control unit 2221 may detect the neutral wire current, and notify the other control unit whether the neutral wire current meets the preset current range.

Optionally, the controller may be configured to: determine that the neutral wire current is less than $-I_{t1}$; and control the positive voltage conversion apparatus and the negative voltage conversion apparatus to decrease the voltage difference between the output voltage of the positive voltage conversion apparatus and the output voltage of the negative voltage conversion apparatus when the output power remains unchanged, so that the neutral wire current falls within the interval $[-I_{t1}, I_{t2}]$.

It should be understood that in the technical solution in this application, the voltage difference between the output voltage of the positive voltage conversion apparatus 221 and the output voltage of the negative voltage conversion apparatus 222 is increased. If both the two voltage conversion apparatuses are boost converters, it may mean that a boost amplitude of the output voltage of the positive voltage conversion apparatus 221 is greater than a boost amplitude of the output voltage of the negative voltage conversion apparatus 222, to increase the voltage difference between the output voltages of the two voltage conversion apparatuses.

In a possible implementation, if the controller includes the first control unit 2211 and the second control unit 2221, when it is detected that the neutral wire current is greater than $I_{t2}$, the first control unit 2211 controls the positive voltage conversion circuit 2212 to increase an output voltage; and when it is detected that the neutral wire current is greater than $I_{t2}$, the second control unit 2221 controls the negative voltage conversion circuit 2222 to decrease an output voltage, so that the neutral wire current falls within the interval $[-I_{t1}, I_{t2}]$.

In another possible implementation, when the neutral wire current is greater than $I_{t2}$, the first control unit 2211 controls the positive voltage conversion circuit 2212 to increase an output voltage; and when the neutral wire current is greater than $I_{t2}$, the second control unit 2221 controls an output voltage of the negative voltage conversion circuit 2222 to remain unchanged, so that the neutral wire current falls within the interval $[-I_{t1}, I_{t2}]$.

In still another possible implementation, when the neutral wire current is greater than $I_{t2}$, the first control unit 2211 controls an output voltage of the positive voltage conversion circuit 2212 to remain unchanged; and when the neutral wire current is greater than $I_{t2}$, the second control unit 2221 controls the negative voltage conversion circuit 2222 to decrease an output voltage, so that the neutral wire current falls within the interval $[-I_{t1}, I_{t2}]$.

Three possible implementations of increasing the voltage difference between the output voltage of the positive voltage conversion apparatus 221 and the output voltage of the negative voltage conversion apparatus 222 are described above. There is another manner in which the voltage difference between the output voltage of the positive voltage conversion apparatus 221 and the output voltage of the negative voltage conversion apparatus 222 can be increased. This is not limited in this application.

For example, a voltage existing before the positive voltage conversion circuit 2212 increases the output voltage is 900 V, and a voltage existing before the negative voltage conversion circuit 2222 increases the output voltage is also 900 V. When it is detected that the neutral wire current is greater than $I_{t2}$, the first control unit 2211 controls the positive voltage conversion circuit 2212 to increase the output voltage, and an adjusted output voltage of the positive voltage conversion circuit 2212 is 1000 V. When it is detected that the neutral wire current is greater than $I_{t2}$, the second control unit 2221 controls the negative voltage conversion circuit 2222 to increase the output voltage, and an adjusted output voltage of the negative voltage conversion circuit 2222 is 950 V. A voltage difference between the output voltage of the positive voltage conversion circuit 2212 and the output voltage of the negative voltage conversion circuit 2222 is increased from 0 V to 50 V. Therefore, the voltage difference between the output voltage of the positive voltage conversion apparatus 221 and the output voltage of the negative voltage conversion apparatus 222 is increased.

In addition, in a process of adjusting the neutral wire current, if the output voltage of the positive voltage conversion apparatus 221 or the negative voltage conversion apparatus 222 reaches an adjustable upper limit value of the output voltage, the controller needs to control the positive voltage conversion apparatus 221 or the negative voltage conversion apparatus 222 to decrease the power, to adjust a range of the neutral wire current.

For example, the controller is further configured to determine whether the output voltage of the positive voltage conversion apparatus 221 is greater than a first preset voltage threshold. The first preset voltage threshold is an adjustable upper limit value of the output voltage of the positive voltage conversion apparatus 221. For example, the first preset voltage threshold may be a rated voltage of the positive voltage conversion apparatus 221.

When the neutral wire current is greater than $I_{t2}$, and the output voltage of the positive voltage conversion apparatus 221 is less than the first preset voltage threshold, the controller is specifically configured to control the positive voltage conversion apparatus 221 and the negative voltage conversion apparatus 222 to increase the voltage difference between the output voltage of the positive voltage conversion apparatus 221 and the output voltage of the negative voltage conversion apparatus 222 when the output power remains unchanged, so that the neutral wire current falls within the interval $[-I_{t1}, I_{t2}]$.

When the neutral wire current is greater than $I_{t2}$, and the output voltage of the positive voltage conversion apparatus 221 is greater than or equal to the first preset voltage threshold, the controller is further configured to control the positive voltage conversion apparatus 221 to decrease the output power.

Optionally, when detecting that the neutral wire current is less than $-I_{t1}$, the controller may control the positive voltage conversion apparatus 221 and the negative voltage conversion apparatus 222 to decrease the voltage difference between the output voltage of the positive voltage conversion apparatus 221 and the output voltage of the negative voltage conversion apparatus 222 when the output power remains unchanged, so that the neutral wire current falls within the interval $[-I_{t1}, I_{t2}]$.

In a possible implementation, when it is detected that the neutral wire current is less than $-I_{t1}$, the first control unit 2211 controls the positive voltage conversion circuit 2212 to decrease an output voltage; and when it is detected that the neutral wire current is less than $-I_{t1}$, the second control unit 2221 controls the negative voltage conversion circuit 2222 to increase an output voltage, so that the neutral wire current falls within the interval $[-I_{t1}, I_{t2}]$.

In another possible implementation, when it is detected that the neutral wire current is less than $-I_{t1}$, the first control unit 2211 controls the positive voltage conversion circuit 2212 to decrease an output voltage; and when it is detected that the neutral wire current is less than $-I_{t1}$, the second control unit 2221 controls an output voltage of the negative voltage conversion circuit 2222 to remain unchanged, so that the neutral wire current falls within the interval $[-I_{t1}, I_{t2}]$.

In still another possible implementation, when it is detected that the neutral wire current is less than $-I_{t1}$, the first control unit 2211 controls an output voltage of the positive voltage conversion circuit 2212 to remain unchanged; and when it is detected that the neutral wire current is less than $-I_{t1}$, the second control unit 2221 controls the negative voltage conversion circuit 2222 to increase an output voltage, so that the neutral wire current falls within the interval $[-I_{t1}, I_{t2}]$.

Three possible implementations of decreasing the voltage difference between the output voltage of the positive voltage conversion apparatus 221 and the output voltage of the negative voltage conversion apparatus 222 are described above. There is another manner in which the voltage difference between the output voltage of the positive voltage conversion apparatus 221 and the output voltage of the negative voltage conversion apparatus 222 can be decreased. This is not limited in this application.

In addition, in a process of adjusting the neutral wire current, if the output voltage of the positive voltage conversion apparatus 221 or the negative voltage conversion apparatus 222 reaches an adjustable upper limit value of the output voltage, the controller needs to control the positive voltage conversion apparatus 221 or the negative voltage conversion apparatus 222 to decrease the power, to adjust a range of the neutral wire current.

For example, the controller is further configured to determine whether the output voltage of the negative voltage conversion apparatus 222 is greater than a second preset voltage threshold. The second preset voltage threshold is an adjustable upper limit value of the output voltage of the negative voltage conversion apparatus 222. For example, the second preset voltage threshold may be a rated voltage of the negative voltage conversion apparatus 222.

When the neutral wire current is less than $-I_{t1}$, and the output voltage of the negative voltage conversion apparatus 222 is less than the second preset voltage threshold, the controller is specifically configured to control the positive voltage conversion apparatus and the negative voltage conversion apparatus 222 to decrease the voltage difference between the output voltage of the positive voltage conversion apparatus and the output voltage of the negative voltage conversion apparatus 222 when the output power remains unchanged, so that the neutral wire current falls within the interval $[-I_{t1}, I_{t2}]$.

When the neutral wire current is less than $-I_{t1}$, and the output voltage of the negative voltage conversion apparatus 222 is greater than or equal to the second preset voltage threshold, the controller is further configured to control the negative voltage conversion apparatus 222 to decrease the output power.

The second preset voltage threshold may be the same as or different from the first preset voltage threshold. This is not limited in this application.

In this embodiment of this application, the controller may control the positive voltage conversion apparatus 221 and the negative voltage conversion apparatus 222 to change the output voltages when the output power remains unchanged, to decrease the neutral wire current. In this manner of adjusting the neutral wire current, the output power of the voltage conversion apparatus is kept unchanged, so that it is ensured that the power supply system can provide maximum output power and provide a larger energy yield. While adjusting the neutral wire current, this improves power generation efficiency of the power supply system, and avoids an additional economic loss.

Figure 3:
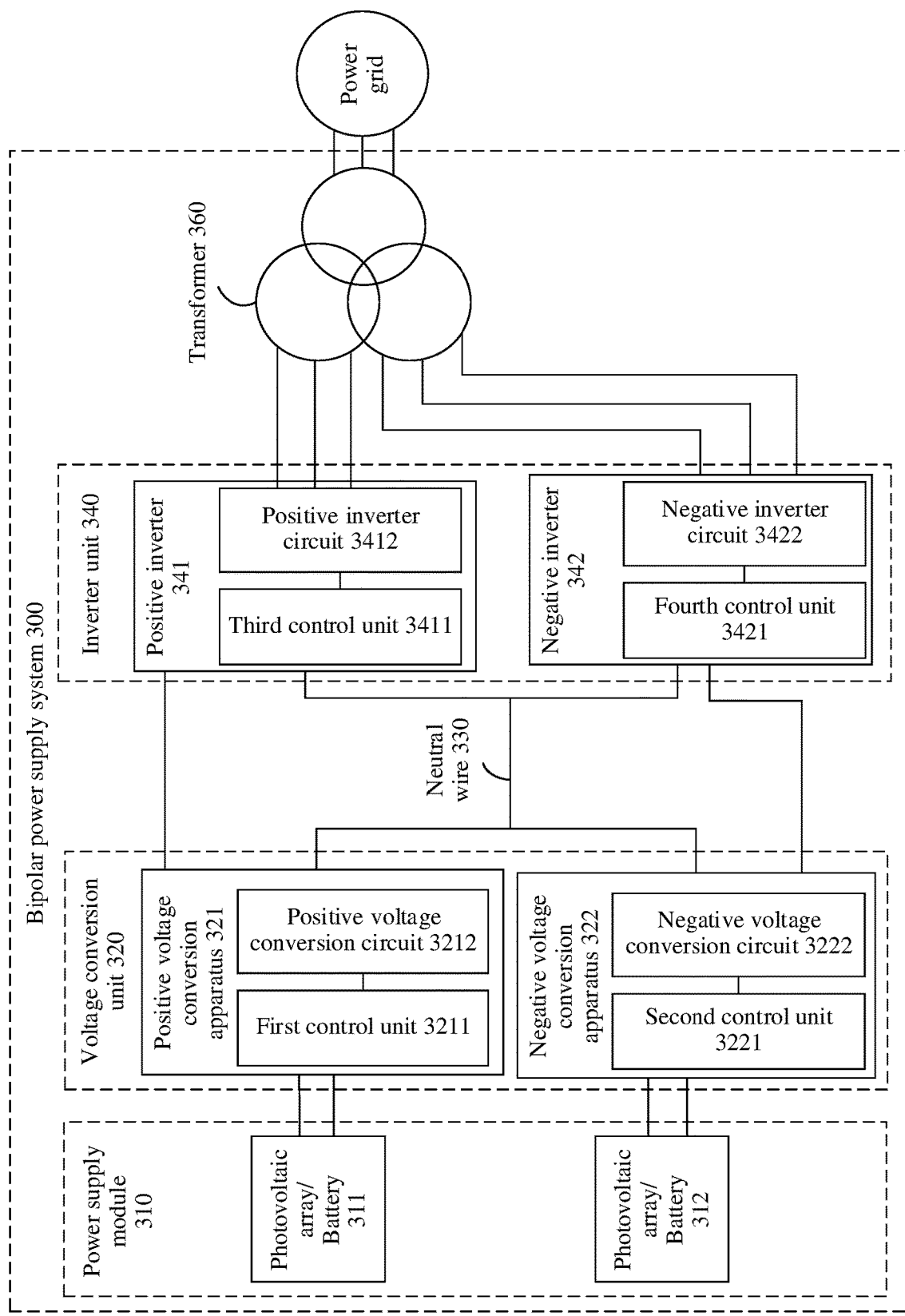
FIG. 3 is a schematic diagram of a structure of another bipolar power supply system 300 according to an embodiment of this application.

FIG. 3 is a schematic diagram of a structure of another bipolar power supply system 300 according to an embodiment of this application. As shown in FIG. 3, the system includes a power supply module 310, a voltage conversion unit 320, an inverter unit 340, a transformer 360, and a controller. A function of the power supply module 310 is the same as that of the power supply module 110 in FIG. 1, a function of the voltage conversion unit 320 is the same as that of the voltage conversion unit 120 in FIG. 1, and a function of the transformer 360 is the same as that of the transformer 160 in FIG. 1. Details are not described again herein. The inverter unit 340 includes a positive inverter 341 and a negative inverter 342. The controller may include at least one of the following control units: a first control unit 3211, a second control unit 3221, a third control unit 3411, and a fourth control unit 3421. The positive inverter 341 may include the third control unit 3411 and a positive inverter circuit 3412. The negative inverter 342 may include the fourth control unit 3421 and a negative inverter circuit 3422. In other words, the third control unit 3411 is disposed in the positive inverter 341, and the fourth control unit 3421 is disposed in the negative inverter circuit 342. A negative output end of a positive voltage conversion apparatus 321 and a positive output end of a negative voltage conversion apparatus 322 are connected to a first end of a neutral wire 330, and a negative input end of the positive inverter 341 and a positive input end of the negative inverter 342 are connected to a second end of the neutral wire 330.

Similarly, the first control unit 3211 is configured to control a positive voltage conversion circuit 3212 to receive electric energy provided by the power supply module in the power supply system, and supply power to the inverter unit 340 after performing direct current voltage conversion. The second control unit 3221 is configured to control a negative voltage conversion circuit 3222 to receive electric energy provided by the power supply module in the power supply system, and supply power to the inverter unit 340 after performing direct current voltage conversion. The inverter unit 340 receives electric energy transmitted by the voltage conversion unit 320, and supplies power to a power grid after performing direct current-to-alternating current voltage conversion.

The controller is configured to: detect whether a neutral wire current meets a preset current range; and control, when the neutral wire current does not meet the preset current range, the positive voltage conversion apparatus 321 and the negative voltage conversion apparatus 322 to change output voltages when output power remains unchanged, so that the neutral wire current meets the preset current range. Optionally, the preset current range is $[-I_{r1}, I_{r2}]$. For content of the preset current range, refer to the foregoing descriptions. Details are not described again herein.

For example, the controller may include the first control unit 3211, the second control unit 3221, the third control unit 3411, and the fourth control unit 3421. The third control unit 3411 and the fourth control unit 3421 may be configured to detect whether the neutral wire current meets the preset current range, and may further send a detection result to the first control unit 3211 and the second control unit 3221.

For example, when the third control unit 3411 or the fourth control unit 3421 detects that the neutral wire current does not meet the preset current range, the third control unit 3411 or the fourth control unit 3421 sends a control signal for changing the output voltage of the positive voltage conversion apparatus 321 to the first control unit 3211 and the second control unit 3221, and the first control unit 3211 and the second control unit 3221 control the positive voltage conversion apparatus 321 to change the output voltage when the output power of the positive voltage conversion apparatus 321 and the negative voltage conversion apparatus 322 remains unchanged, so that the neutral wire current meets the preset current range.

For example, when the third control unit 3411 detects that the current on the neutral wire 330 is greater than $I_{r2}$, the third control unit 3411 sends a control signal for changing the output voltage of the positive voltage conversion apparatus 321 to the first control unit 3211, and the first control unit 3211 controls the positive voltage conversion apparatus 321 to change the output voltage when the output power remains unchanged; and when the fourth control unit 3421 detects that the current on the neutral wire 330 is greater than $I_{r2}$, the fourth control unit 3421 sends a control signal for changing the output voltage of the negative voltage conversion apparatus 322 to the second control unit 3221, and the second control unit 3221 controls the negative voltage conversion apparatus 322 to change the output voltage when the output power remains unchanged, to increase a voltage difference between the output voltage of the positive voltage conversion apparatus 321 and the output voltage of the negative voltage conversion apparatus 322, so that the neutral wire current falls within an interval $[-I_{r1}, I_{r2}]$.

It should be understood that in the technical solution in this application, the voltage difference between the output voltage of the positive voltage conversion apparatus 321 and the output voltage of the negative voltage conversion apparatus 322 is increased. If both the two voltage conversion apparatuses are boost converters, it may mean that a boost amplitude of the output voltage of the positive voltage conversion apparatus 321 is greater than a boost amplitude of the output voltage of the negative voltage conversion apparatus 322, to increase the voltage difference between the output voltage of the positive voltage conversion apparatus 321 and the output voltage of the negative voltage conversion apparatus 322.

In a possible implementation, when the third control unit 3411 detects that the neutral wire current is greater than $I_{r2}$, the third control unit 3411 sends a control signal for increasing an output voltage of the positive voltage conversion circuit 3212 to the first control unit 3211, and the first control unit 3211 controls the positive voltage conversion circuit 3212 to increase the output voltage when the output power remains unchanged; and when the fourth control unit 3421 detects that the neutral wire current is greater than $I_{r2}$, the fourth control unit 3421 sends a control signal for decreasing an output voltage of the negative voltage conversion circuit 3222 to the second control unit 3221, and the second control unit 3221 controls the negative voltage conversion circuit 3222 to decrease the output voltage when the output power remains unchanged, to increase a voltage difference between the output voltage of the positive voltage conversion circuit 3212 and the output voltage of the negative voltage conversion circuit 3222, so that the neutral wire current falls within the interval $[-I_{r1}, I_{r2}]$.

In another possible implementation, when the third control unit 3411 detects that the neutral wire current is greater than $I_{r2}$, the third control unit 3411 sends a control signal for increasing an output voltage of the positive voltage conversion circuit 3212 to the first control unit 3211, and the first control unit 3211 controls the positive voltage conversion circuit 3212 to increase the output voltage when the output power remains unchanged; and when the fourth control unit 3421 detects that the neutral wire current is greater than $I_{r2}$, the fourth control unit 3421 sends a control signal for controlling an output voltage of the negative voltage conversion circuit 3222 to remain unchanged to the second control unit 3221, and the second control unit 3221 controls the output voltage of the negative voltage conversion circuit 3222 to remain unchanged, to increase the voltage difference between the output voltage of the positive voltage conversion apparatus 321 and the output voltage of the negative voltage conversion apparatus 322, so that the neutral wire current falls within the interval $[-I_{r1}, I_{r2}]$.

In still another possible implementation, when the third control unit 3411 detects that the neutral wire current is greater than $I_{r2}$, the third control unit 3411 sends a control signal for controlling an output voltage of the positive voltage conversion circuit 3212 to remain unchanged to the first control unit 3211, and the first control unit 3211 controls the output voltage of the positive voltage conversion circuit 3212 to remain unchanged; and when the fourth control unit 3421 detects that the neutral wire current is greater than $I_{t2}$, the fourth control unit 3421 sends a control signal for controlling an output voltage of the negative voltage conversion circuit 3222 to be decreased to the second control unit 3221, and the second control unit 3221 controls the negative voltage conversion circuit 3222 to decrease the output voltage when the output power remains unchanged, to increase a voltage difference between the output voltage of the positive voltage conversion circuit 3212 and the output voltage of the negative voltage conversion circuit 3222, so that the neutral wire current falls within the interval $[-I_{t1}, I_{t2}]$.

Three possible implementations of increasing the voltage difference between the output voltage of the positive voltage conversion apparatus 321 and the output voltage of the negative voltage conversion apparatus 322 are described above. There is another manner in which the voltage difference between the output voltage of the positive voltage conversion apparatus 321 and the output voltage of the negative voltage conversion apparatus 322 can be increased. This is not limited in this application.

In addition, in a process of adjusting the neutral wire current, if the output voltage of the positive voltage conversion apparatus 321 or the negative voltage conversion apparatus 322 reaches an adjustable upper limit value of the output voltage, the controller needs to control the positive voltage conversion apparatus 321 or the negative voltage conversion apparatus 322 to decrease the power, to adjust a range of the neutral wire current. For a specific solution, refer to the foregoing descriptions. Details are not described again herein.

Optionally, when the third control unit 3411 detects that the neutral wire current is less than $-I_{t1}$, the third control unit 3411 sends a control signal for changing the output voltage of the positive voltage conversion apparatus 321 to the first control unit 3211, and the first control unit 3211 controls the positive voltage conversion apparatus 321 to change the output voltage; and when the fourth control unit 3421 detects that the neutral wire current is less than $-I_{t1}$, the fourth control unit 3421 sends a control signal for changing the output voltage of the negative voltage conversion apparatus 322 to the second control unit 3221, and the second control unit 3221 controls the negative voltage conversion apparatus 322 to change the output voltage, to decrease a voltage difference between the output voltage of the positive voltage conversion apparatus 321 and the output voltage of the negative voltage conversion apparatus 322, so that the neutral wire current falls within an interval $[-I_{t1}, I_{t2}]$.

In a possible implementation, when the third control unit 3411 detects that the neutral wire current is less than $-I_{t1}$, the third control unit 3411 sends a control signal for decreasing an output voltage of the positive voltage conversion circuit 3212 to the first control unit 3211 and the first control unit 3211 controls the positive voltage conversion circuit 3212 to decrease the output voltage when the output power remains unchanged; and when the fourth control unit 3421 detects that the neutral wire current is less than $-I_{t1}$, the fourth control unit 3421 sends a control signal for increasing an output voltage of the negative voltage conversion circuit 3222 to the second control unit 3221, and the second control unit 3221 controls the negative voltage conversion circuit 3222 to increase the output voltage, to decrease a voltage difference between the output voltage of the positive voltage conversion circuit 3212 and the output voltage of the negative voltage conversion circuit 3222, so that the neutral wire current falls within an interval $[-I_{t1}, I_{t2}]$.

In another possible implementation, when the third control unit 3411 detects that the neutral wire current is less than $-I_{t1}$, the third control unit 3411 sends a control signal for decreasing an output voltage of the positive voltage conversion circuit 3212 to the first control unit 3211, and the first control unit 3211 controls the positive voltage conversion circuit 3212 to decrease the output voltage when the output power remains unchanged; and when the fourth control unit 3421 detects that the neutral wire current is less than $-I_{t1}$, the fourth control unit 3421 sends a control signal for controlling an output voltage of the negative voltage conversion circuit 3222 to remain unchanged to the second control unit 3221, and the second control unit 3221 controls the output voltage of the negative voltage conversion circuit 3222 to remain unchanged, to decrease the voltage difference between the output voltage of the positive voltage conversion apparatus 321 and the output voltage of the negative voltage conversion apparatus 322, so that the neutral wire current falls within the interval $[-I_{t1}, I_{t2}]$.

In still another possible implementation, when the third control unit 3411 detects that the neutral wire current is less than $-I_{t1}$, the third control unit 3411 sends a control signal for controlling an output voltage of the positive voltage conversion circuit 3212 to remain unchanged to the first control unit 3211, and the first control unit 3211 controls the output voltage of the positive voltage conversion circuit 3212 to remain unchanged; and when the fourth control unit 3421 detects that the neutral wire current is less than $-I_{t1}$, the fourth control unit 3421 sends a control signal for controlling an output voltage of the negative voltage conversion circuit 3222 to be increased to the second control unit 3221, and the second control unit 3221 controls the negative voltage conversion circuit 3222 to increase the output voltage, to decrease a voltage difference between the output voltage of the positive voltage conversion circuit 3212 and the output voltage of the negative voltage conversion circuit 3222, so that the neutral wire current falls within the interval $[-I_{t1}, I_{t2}]$.

Three possible implementations of decreasing the voltage difference between the output voltage of the positive voltage conversion apparatus 321 and the output voltage of the negative voltage conversion apparatus 322 are described above. There is another manner in which the voltage difference between the output voltage of the positive voltage conversion apparatus 321 and the output voltage of the negative voltage conversion apparatus 322 can be decreased. This is not limited in this application.

Therefore, in this embodiment of this application, the controller may control the positive voltage conversion apparatus 321 and the negative voltage conversion apparatus 322 to change the output voltages when the output power remains unchanged, to decrease the neutral wire current. In this manner of adjusting the neutral wire current, the output power of the voltage conversion apparatus is kept unchanged, so that it is ensured that the power supply system can provide maximum output power and provide a larger energy yield. While adjusting the neutral wire current, this improves power generation efficiency of the power supply system, and avoids an additional economic loss.

Figure 4:
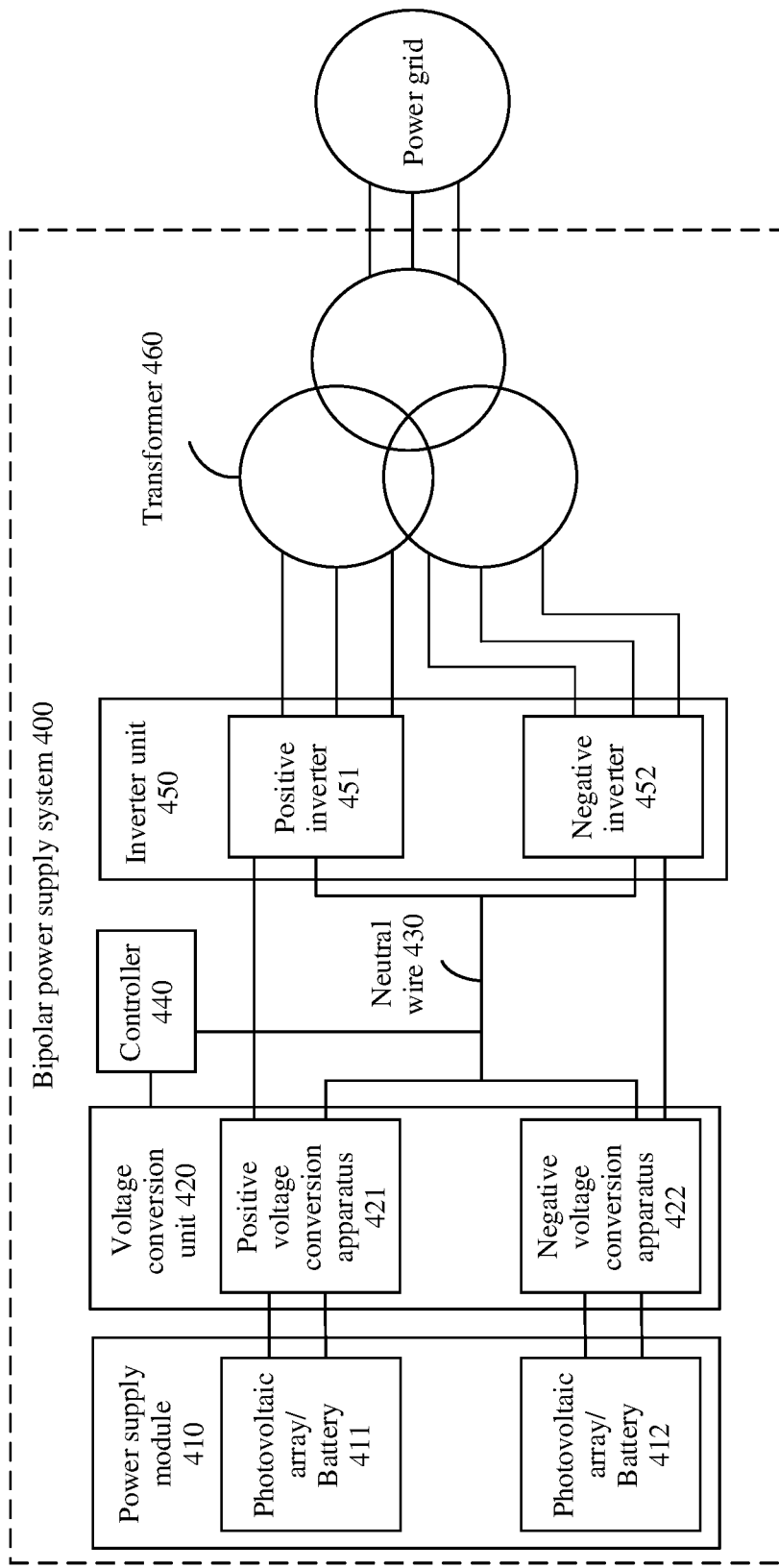
FIG. 4 is a schematic diagram of a structure of another bipolar power supply system 400 according to an embodiment of this application.

FIG. 4 is a schematic diagram of a structure of another bipolar power supply system 400 according to an embodiment of this application. As shown in FIG. 4, the system includes a power supply module 410, a voltage conversion unit 420, a controller 440, an inverter unit 450, and a transformer 460. Functions of the power supply module 410 and the transformer 460 are the same as those of the power supply module no and the transformer 160 in FIG. 1. Details are not described again herein. The voltage conversion unit 420 includes a positive voltage conversion apparatus 421 and a negative voltage conversion apparatus 422. The inverter unit 450 includes a positive inverter 451 and a negative inverter 452. A negative output end of the positive voltage conversion apparatus 421 and a positive output end of the negative voltage conversion apparatus 422 are connected to a first end of a neutral wire 430, and a negative input end of the positive inverter 451 and a positive input end of the negative inverter 452 are connected to a second end of the neutral wire 430.

The voltage conversion unit 420 is configured to: receive electric energy provided by the power supply module 410, and output a direct current to the inverter unit 450 after performing direct current conversion. The inverter unit 450 is configured to: convert the direct current into an alternating current, and output the alternating current to a power grid.

The controller 440 may be an independent module, and is connected to the neutral wire and the voltage conversion unit 420. The controller 440 may be configured to perform the foregoing methods or steps performed by the controller.

Specifically, the controller 440 is configured to: detect whether a neutral wire current meets a preset current range; and control, when the neutral wire current does not meet the preset current range, the positive voltage conversion apparatus 421 and the negative voltage conversion apparatus 422 to change output voltages when output power remains unchanged, so that the neutral wire current meets the preset current range. Optionally, the preset current range is [$-I_{t1}$, $I_{t2}$]. For content of the preset current range, refer to the foregoing descriptions. Details are not described again herein.

For example, the controller 440 is specifically configured to: when detecting that the neutral wire current is greater than $I_{t2}$, control the positive voltage conversion apparatus 421 and the negative voltage conversion apparatus 422 to increase a voltage difference between the output voltage of the positive voltage conversion apparatus 421 and the output voltage of the negative voltage conversion apparatus 422 when the output power remains unchanged, so that the neutral wire current falls within an interval [$-I_{t1}$, $I_{t2}$].

In a possible implementation, when detecting that the neutral wire current is greater than $I_{t2}$, the controller 440 controls the positive voltage conversion apparatus 421 and the negative voltage conversion apparatus 422 to increase the output voltage of the positive voltage conversion apparatus 421 and decrease the output voltage of the negative voltage conversion apparatus 422 when the output power remains unchanged.

In another possible implementation, when detecting that the neutral wire current is greater than $I_{t2}$, the controller 440 controls the positive voltage conversion apparatus 421 and the negative voltage conversion apparatus 422 to increase the output voltage of the positive voltage conversion apparatus 421 and keep the output voltage of the negative voltage conversion apparatus 422 unchanged when the output power remains unchanged.

In still another possible implementation, when detecting that the neutral wire current is greater than $I_{t2}$, the controller 440 controls the positive voltage conversion apparatus 421 and the negative voltage conversion apparatus 422 to keep the output voltage of the positive voltage conversion apparatus 421 unchanged and decrease the output voltage of the negative voltage conversion apparatus 422 when the output power remains unchanged.

In addition, in a process of adjusting the neutral wire current, if the output voltage of the positive voltage conversion apparatus 421 or the negative voltage conversion apparatus 422 reaches an adjustable upper limit value of the output voltage, the controller needs to control the positive voltage conversion apparatus 421 or the negative voltage conversion apparatus 422 to decrease the power, to adjust a range of the neutral wire current. For a specific solution, refer to the foregoing descriptions. Details are not described again herein.

The controller 440 is further specifically configured to: when detecting that the neutral wire current is less than $-I_{t1}$, control the positive voltage conversion apparatus 421 and the negative voltage conversion apparatus 422 to decrease a voltage difference between the output voltage of the positive voltage conversion apparatus 421 and the output voltage of the negative voltage conversion apparatus 422 when the output power remains unchanged, so that the neutral wire current falls within an interval [$-I_{t1}$, $I_{t2}$].

In a possible implementation, when detecting that the neutral wire current is less than $-I_{t1}$, the controller 440 controls the positive voltage conversion apparatus 421 and the negative voltage conversion apparatus 422 to decrease the output voltage of the positive voltage conversion apparatus 421 and increase the output voltage of the negative voltage conversion apparatus 422 when the output power remains unchanged.

In another possible implementation, when detecting that the neutral wire current is less than $-I_{t1}$, the controller 440 controls the positive voltage conversion apparatus 421 and the negative voltage conversion apparatus 422 to decrease the output voltage of the positive voltage conversion apparatus 421 and keep the output voltage of the negative voltage conversion apparatus 422 unchanged when the output power remains unchanged.

In still another possible implementation, when detecting that the neutral wire current is less than $-I_{t1}$, the controller 440 controls the positive voltage conversion apparatus 421 and the negative voltage conversion apparatus 422 to keep the output voltage of the positive voltage conversion apparatus 421 unchanged and increase the output voltage of the negative voltage conversion apparatus 422 when the output power remains unchanged.

Therefore, in this embodiment of this application, the controller 440 may control the positive voltage conversion apparatus 421 and the negative voltage conversion apparatus 422 to change the output voltages when the output power remains unchanged, to decrease the neutral wire current. In this manner of adjusting the neutral wire current, the output power of the voltage conversion apparatus is kept unchanged, so that it is ensured that the power supply system can provide maximum output power and provide a larger energy yield. While adjusting the neutral wire current, this improves power generation efficiency of the power supply system, and avoids an additional economic loss.

It should be understood that FIG. 2 to FIG. 4 are merely examples for describing embodiments of this application. In practice, the bipolar power supply system in this application may be appropriately modified. For example, the bipolar power supply system may include more or fewer functional modules, devices, and units than those in FIG. 2 to FIG. 4, and all the functional modules, devices, and units fall within the protection scope of embodiments of this application.

It should be understood that in FIG. 2 to FIG. 4, only one bipolar power supply system that supplies power to a power grid is used for description. Optionally, the solutions in embodiments of this application may also be applied to a scenario in which a plurality of bipolar power supply systems supply power to the power grid. The plurality of bipolar power supply systems may be connected in parallel on a network access side. Optionally, if neutral wire currents in the plurality of bipolar power supply systems are adjusted, when output voltages of a positive voltage conversion apparatus and a negative voltage apparatus in each bipolar power supply system are adjusted, it further needs to be ensured that sums of output voltages of positive voltage conversion apparatuses and negative voltage conversion apparatuses in the plurality of bipolar power supply systems are the same (or are the same as much as possible), to decrease a current in a circulation path between the plurality of bipolar voltage conversion systems, so as to decrease power loss in the plurality of bipolar power supply systems.

Figure 5:
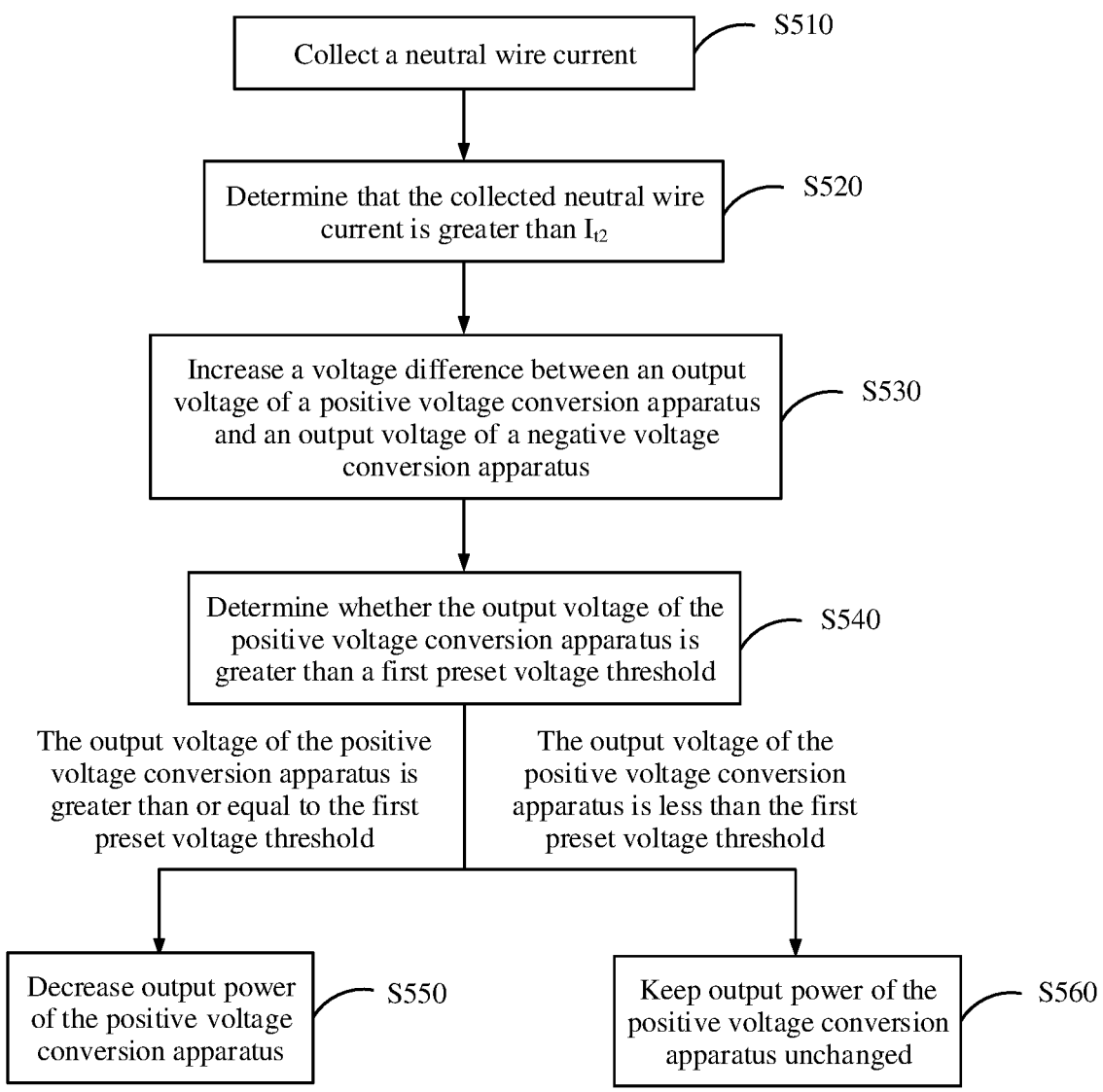
FIG. 5 is a schematic diagram of control logic of a bipolar power supply system according to an embodiment of this application.
Figure 6:
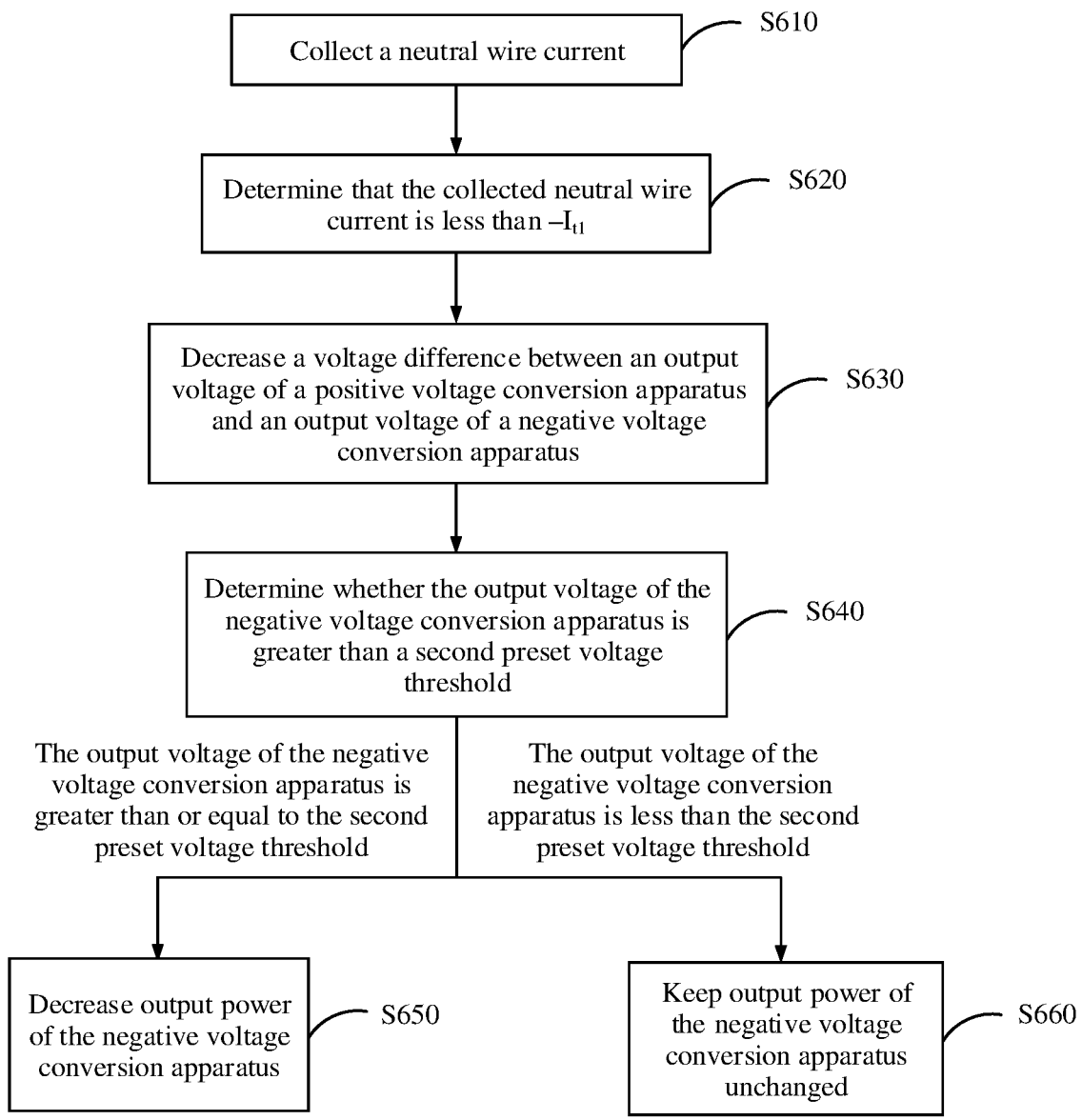
FIG. 6 is a schematic diagram of control logic of a bipolar power supply system according to another embodiment of this application.

The following describes in detail the control method for a bipolar power supply system in this application with reference to FIG. 5 and FIG. 6.

FIG. 5 is a schematic diagram of control logic of a bipolar power supply system according to an embodiment of this application.

S510: Collect a neutral wire current.

Specifically, the neutral wire current may be collected by a first control unit disposed in a positive voltage conversion apparatus, may be collected by a second control unit disposed in a negative voltage conversion apparatus, may be collected by a third control unit disposed in a positive inverter, may be collected by a fourth control unit disposed in a negative inverter, or may be collected by a controller connected to a neutral wire. A unit that implements a sampling function is in a connection relationship with the neutral wire, and can collect the neutral wire current.

S520: Determine that the collected neutral wire current is greater than $I_{t2}$.

Optionally, the first control unit disposed in the positive voltage conversion apparatus and the second control unit disposed in the negative voltage conversion apparatus may collect the neutral wire current, and determine a magnitude relationship between the collected neutral wire current and $I_{t2}$; the third control unit disposed in the positive inverter and the fourth control unit disposed in the negative inverter may collect the neutral wire current, and determine a magnitude relationship between the collected neutral wire current and $I_{t2}$; or the controller connected to the neutral wire collects the neutral wire current, and determines a magnitude relationship between the collected neutral wire current and $I_{t2}$.

S530: When the neutral wire current is greater than $I_{t2}$, control the positive voltage conversion apparatus and the negative voltage conversion apparatus to increase a voltage difference between an output voltage of the positive voltage conversion apparatus and an output voltage of the negative voltage conversion apparatus when output power remains unchanged, so that the neutral wire current is less than $I_{t2}$.

It should be understood that a specific manner of increasing the voltage difference between the output voltage of the positive voltage conversion apparatus and the output voltage of the negative voltage conversion apparatus is shown in FIG. 2 to FIG. 4. Details are not described again herein.

S540: Determine whether the output voltage of the positive voltage conversion apparatus is greater than a first preset voltage threshold. For descriptions of the first preset voltage threshold, refer to the foregoing descriptions. Details are not described again herein.

Specifically, when adjusting the output voltage of the positive voltage conversion apparatus, the controller determines whether the output voltage of the positive voltage conversion apparatus is greater than the first preset voltage threshold.

S550: When determining that the output voltage of the positive voltage conversion apparatus is greater than or equal to the first preset voltage threshold, the controller controls the positive voltage conversion apparatus to decrease the output power.

S560: When determining that the output voltage of the positive voltage conversion apparatus is less than the first preset voltage threshold, the controller controls the output power of the positive voltage conversion apparatus to remain unchanged.

Therefore, in this embodiment of this application, when the controller controls the output power of the positive voltage conversion apparatus and the negative voltage conversion apparatus to remain unchanged, the controller controls the output voltages of the positive voltage conversion apparatus and the negative voltage conversion apparatus, to change the neutral wire current. In this manner of adjusting the neutral wire current, the output power of the voltage conversion apparatus is kept unchanged, so that it is ensured that the power supply system can provide maximum output power and provide a larger energy yield. While adjusting the neutral wire current, this improves power generation efficiency of the power supply system, and avoids an additional economic loss.

FIG. 6 is a schematic diagram of control logic of a bipolar power supply system according to another embodiment of this application.

S610: Collect a neutral wire current. Step 610 is the same as step 510. Details are not described again herein.

S620: Determine that the collected neutral wire current is less than $-I_{t1}$.

In this embodiment of this application, a first control unit disposed in a positive voltage conversion apparatus and a second control unit disposed in a negative voltage conversion apparatus may collect the neutral wire current, and determine a magnitude relationship between the collected neutral wire current and $-I_{t1}$; a third control unit disposed in a positive inverter and a fourth control unit disposed in a negative inverter may collect the neutral wire current, and determine a magnitude relationship between the collected neutral wire current and $-I_{t1}$; or a controller connected to a neutral wire collects the neutral wire current, and determines a magnitude relationship between the collected neutral wire current and $-I_{t1}$.

S630: When the neutral wire current is less than $-I_{t1}$, control the positive voltage conversion apparatus and the negative voltage conversion apparatus to decrease a voltage difference between an output voltage of the positive voltage conversion apparatus and an output voltage of the negative voltage conversion apparatus when output power remains unchanged, so that the neutral wire current is greater than $-I_{t1}$.

It should be understood that a specific manner of decreasing the voltage difference between the output voltage of the positive voltage conversion apparatus and the output voltage of the negative voltage conversion apparatus is shown in FIG. 2 to FIG. 4. Details are not described again herein.

S640: Determine whether the output voltage of the negative voltage conversion apparatus is greater than a second preset voltage threshold. For descriptions of the second preset voltage threshold, refer to the foregoing descriptions. Details are not described again herein.

Specifically, when adjusting the output voltage of the negative voltage conversion apparatus, the controller determines whether the output voltage of the negative voltage conversion apparatus is greater than the second preset voltage threshold.

S650: When determining that the output voltage of the negative voltage conversion apparatus is greater than or equal to the second preset voltage threshold, the controller controls the negative voltage conversion apparatus to decrease the output power.

S660: When determining that the output voltage of the negative voltage conversion apparatus is less than the second preset voltage threshold, the controller controls the output power of the negative voltage conversion apparatus to remain unchanged.

Therefore, in this embodiment of this application, when the controller controls the output power of the positive voltage conversion apparatus and the negative voltage conversion apparatus to remain unchanged, the controller controls the output voltages of the positive voltage conversion apparatus and the negative voltage conversion apparatus, to change the neutral wire current, so that the neutral wire current falls within a cable specification range, to ensure system stability.

Figure 7:
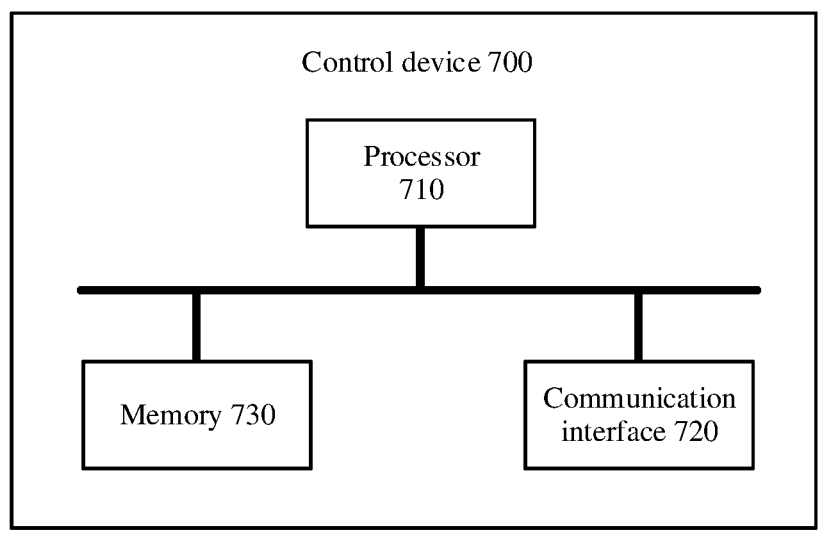
FIG. 7 is a schematic diagram of a structure of a control device 700 according to an embodiment of this application.

FIG. 7 is a schematic diagram of a structure of a control device 700 according to an embodiment of this application. As shown in FIG. 7, the control device 700 includes a processor 710 and a communication interface 720. Optionally, the control device 700 may further include a memory 730. Optionally, the memory 730 may be included in the processor 710. The processor 710, the communication interface 720, and the memory 730 communicate with each other by using an internal connection path. The memory 730 is configured to store instructions. The processor 710 is configured to execute the instructions stored in the memory 730, to implement the control method provided in embodiments of this application.

Optionally, the control device 700 may be configured to perform functions of the controllers in FIG. 2 to FIG. 4, or perform functions of the control units in FIG. 2 to FIG. 4, for example, the first control units 2211 and 3211 or the second control units 2221 and 3221 in FIG. 2 and FIG. 3, the third control unit 3411 and the fourth control unit 3421 in FIG. 3, or the controller 440 in FIG. 4.

The terms "component", "module", "system", and the like used in this specification are used to represent computer-related entities, hardware, firmware, combinations of hardware and software, software, or software being executed. For example, a component may be but is not limited to a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that the example units, algorithms, and steps described with reference to embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for convenient and brief description, for detailed working processes of the system, apparatus, and unit described above, refer to the corresponding processes in the foregoing method embodiments. Details are not described again herein.

In the several embodiments provided in this application, it should be understood that the disclosed system, apparatus, and method may be implemented in other manners. For example, the described apparatus embodiment is merely an example. For example, division into the units is merely logical function division, and in actual implementation, another division manner may be used. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located at one location, or may be distributed on a plurality of network units. Some or all of the units may be selected based on actual requirements to achieve the objectives of the solutions in embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The storage medium includes any medium that can store program code, for example, a USB flash drive, a removable hard disk, a read-only memory (ROM), a random access memory (RAM), a magnetic disk, or an optical disc. The storage medium may be a non-transitory computer readable storage medium.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A bipolar power supply system, comprising:
a voltage conversion circuit, configured to:
receive electric energy provided by a power generation circuit; and
output a direct current to an inverter circuit after performing direct current conversion;
the inverter circuit, configured to:
convert the direct current into an alternating current; and
output the alternating current to a power grid,
wherein:
the voltage conversion circuit comprises a positive voltage conversion apparatus and a negative voltage conversion apparatus,
the inverter circuit comprises a positive inverter and a negative inverter,
a positive output end of the positive voltage conversion apparatus is connected to a positive input end of the positive inverter,
a negative output end of the negative voltage conversion apparatus is connected to a negative input end of the negative inverter,
a negative output end of the positive voltage conversion apparatus and a positive output end of the negative voltage conversion apparatus are connected to a first end of a neutral wire, and
a negative input end of the positive inverter and a positive input end of the negative inverter are connected to a second end of the neutral wire; and
a controller, configured to:
detect whether a neutral wire current meets a preset current range, wherein the neutral wire current is a current passing through the neutral wire; and
control, when the neutral wire current does not meet the preset current range, the positive voltage conversion apparatus and the negative voltage conversion apparatus to change output voltages when output power remains unchanged, so that the neutral wire current meets the preset current range.

2. The system according to claim 1, wherein:
the preset current range is $[-I_{t1}, I_{t2}]$,
$-I_{t1}$ represents a first preset current threshold,
$I_{t2}$, represents a second preset current threshold,
a direction of the neutral wire current is from the inverter circuit to the voltage conversion circuit,
a positive direction of the current range is from the inverter circuit to the voltage conversion circuit,
a negative direction of the current range is from the voltage conversion circuit to the inverter circuit, and
the controller is further configured to:
determine that the neutral wire current is greater than $I_{t2}$; and
control the positive voltage conversion apparatus and the negative voltage conversion apparatus to increase a voltage difference between an output voltage of the positive voltage conversion apparatus and an output voltage of the negative voltage conversion apparatus when the output power remains unchanged, so that the neutral wire current falls within the preset current range $[-I_{t1}, I_{t2}]$.

3. The system according to claim 2, wherein:
the controller comprises:
a first control circuit disposed in the positive voltage conversion apparatus; and
a second control circuit disposed in the negative voltage conversion apparatus,
the first control circuit is configured to:
when the neutral wire current is greater than $I_{t2}$, control the positive voltage conversion apparatus to increase the output voltage, and
the second control circuit is configured to:
when the neutral wire current is greater than $I_{t2}$, control the negative voltage conversion apparatus to decrease the output voltage.

4. The system according to claim 2, wherein:
the controller comprises:
a first control circuit disposed in the positive voltage conversion apparatus; and
a second control circuit disposed in the negative voltage conversion apparatus,
the first control circuit is configured to:
when the neutral wire current is greater than $I_{t2}$, control the positive voltage conversion apparatus to increase the output voltage, and
the second control circuit is configured to:
when the neutral wire current is greater than $I_{t2}$, control the output voltage of the negative voltage conversion apparatus to remain unchanged.

5. The system according to claim 2, wherein:
the controller comprises:
a first control circuit disposed in the positive voltage conversion apparatus; and
a second control circuit disposed in the negative voltage conversion apparatus,
the first control circuit is configured to:
when the neutral wire current is greater than $I_{t2}$, control the output voltage of the positive voltage conversion apparatus to remain unchanged, and
the second control circuit is configured to:
when the neutral wire current is greater than $I_{t2}$, control the negative voltage conversion apparatus to decrease the output voltage.

6. The system according to claim 2, wherein:
the controller is further configured to determine whether the output voltage of the positive voltage conversion apparatus is greater than a first preset voltage threshold,
the first preset voltage threshold is an adjustable upper limit value of the output voltage of the positive voltage conversion apparatus, and
the controller is further configured to:
when the neutral wire current is greater than $I_{t2}$, and the output voltage of the positive voltage conversion apparatus is less than the first preset voltage threshold, control the positive voltage conversion apparatus and the negative voltage conversion apparatus to increase the voltage difference between the output voltage of the positive voltage conversion apparatus and the output voltage of the negative voltage conversion apparatus when the output power remains unchanged, so that the neutral wire current falls within the preset current range $[-I_{t1}, I_{t2}]$; or
the controller is further configured to:
when the neutral wire current is greater than $I_{t2}$, and the output voltage of the positive voltage conversion apparatus is greater than or equal to the first preset voltage threshold, control the positive voltage conversion apparatus to decrease the output power.

7. The system according to claim 1, wherein:
the preset current range is $[-I_{t1}, I_{t2}]$,
$-I_{t1}$ represents a first preset current threshold,
$I_{t2}$, represents a second preset current threshold,
a direction of the neutral wire current is from the inverter circuit to the voltage conversion circuit, a positive direction of the current range is from the inverter circuit to the voltage conversion circuit,
a negative direction of the current range is from the voltage conversion circuit to the inverter circuit, and
the controller is further configured to:
  determine that the neutral wire current is less than $-I_{t1}$; and
  control the positive voltage conversion apparatus and the negative voltage conversion apparatus to decrease a voltage difference between an output voltage of the positive voltage conversion apparatus and an output voltage of the negative voltage conversion apparatus when the output power remains unchanged, so that the neutral wire current falls within the preset current range $[-I_{t1}, I_{t2}]$.

8. The system according to claim 7, wherein:
the controller comprises:
  a first control circuit disposed in the positive voltage conversion apparatus; and
  a second control circuit disposed in the negative voltage conversion apparatus,
the first control circuit is configured to:
  when the neutral wire current is less than $-I_{t1}$, control the positive voltage conversion apparatus to decrease the output voltage, and
the second control circuit is configured to:
  when the neutral wire current is less than $-I_{t1}$, control the negative voltage conversion apparatus to increase the output voltage.

9. The system according to claim 7, wherein:
the controller comprises:
  a first control circuit disposed in the positive voltage conversion apparatus; and
  a second control circuit disposed in the negative voltage conversion apparatus,
the first control circuit is configured to:
  when the neutral wire current is less than $-I_{t1}$, control the positive voltage conversion apparatus to decrease the output voltage, and
the second control circuit is configured to:
  when the neutral wire current is less than $-I_{t1}$, control the output voltage of the negative voltage conversion apparatus to remain unchanged.

10. The system according to claim 7, wherein:
the controller comprises:
  a first control circuit disposed in the positive voltage conversion apparatus; and
  a second control circuit disposed in the negative voltage conversion apparatus,
the first control circuit is configured to:
  when the neutral wire current is less than $-I_{t1}$, control the output voltage of the positive voltage conversion apparatus to remain unchanged, and
the second control circuit is configured to:
  when the neutral wire current is less than $-I_{t1}$, control the negative voltage conversion apparatus to increase the output voltage.

11. The system according to claim 7, wherein the controller is further configured to:
  determine whether the output voltage of the negative voltage conversion apparatus is greater than a second preset voltage threshold, wherein the second preset voltage threshold is an adjustable upper limit value of the output voltage of the negative voltage conversion apparatus; and the controller is further configured to:
  when the neutral wire current is less than $-I_{t1}$, and the output voltage of the negative voltage conversion apparatus is less than the second preset voltage threshold, control the positive voltage conversion apparatus and the negative voltage conversion apparatus to decrease the voltage difference between the output voltage of the positive voltage conversion apparatus and the output voltage of the negative voltage conversion apparatus when the output power remains unchanged, so that the neutral wire current falls within the preset current range $[-I_{t1}, I_{t2}]$; or
the controller is further configured to:
  when the neutral wire current is less than $-I_{t1}$, and the output voltage of the negative voltage conversion apparatus is greater than or equal to the second preset voltage threshold, control the negative voltage conversion apparatus to decrease the output power.

12. A control method for a bipolar power supply system, wherein:
the bipolar power supply system comprises:
  a voltage conversion circuit;
  an inverter circuit; and
  a controller,
the voltage conversion circuit is configured to:
  receive electric energy provided by a power generation circuit; and
  output a direct current to the inverter circuit after performing direct current conversion,
the inverter circuit is configured to:
  convert the direct current into an alternating current; and
  output the alternating current to a power grid,
the voltage conversion circuit comprises:
  a positive voltage conversion apparatus; and
  a negative voltage conversion apparatus,
the inverter circuit comprises:
  a positive inverter; and
  a negative inverter,
a positive output end of the positive voltage conversion apparatus is connected to a positive input end of the positive inverter,
a negative output end of the negative voltage conversion apparatus is connected to a negative input end of the negative inverter,
a negative output end of the positive voltage conversion apparatus and a positive output end of the negative voltage conversion apparatus are connected to a first end of a neutral wire,
a negative input end of the positive inverter and a positive input end of the negative inverter are connected to a second end of the neutral wire, and
the method comprises:
detecting, by the controller, whether a neutral wire current meets a preset current range, wherein the neutral wire current is a current passing through the neutral wire; and
controlling, by the controller when the neutral wire current does not meet the preset current range, the positive voltage conversion apparatus and the negative voltage conversion apparatus to change output voltages when output power remains unchanged, so that the neutral wire current meets the preset current range.

13. The method according to claim 12, wherein:
the preset current range is $[-I_{t1}, I_{t2}]$,
$-I_{t1}$ represents a first preset current threshold,
$I_{t2}$ represents a second preset current threshold, a direction of the neutral wire current is from the inverter circuit to the voltage conversion circuit, a positive direction of the current range is from the inverter circuit to the voltage conversion circuit, a negative direction of the current range is from the voltage conversion circuit to the inverter circuit; and controlling, by the controller when the neutral wire current does not meet the preset current range, the positive voltage conversion apparatus and the negative voltage conversion apparatus to change the output voltages when the output power remains unchanged comprises:

determining, by the controller, that the neutral wire current is greater than $I_{t2}$; and controlling, by the controller, the positive voltage conversion apparatus and the negative voltage conversion apparatus to increase a voltage difference between an output voltage of the positive voltage conversion apparatus and an output voltage of the negative voltage conversion apparatus when the output power remains unchanged, so that the neutral wire current falls within the preset current range $[-I_{t1}, I_{t2}]$.

14. The method according to claim 13, wherein:
the controller comprises:
  a first control circuit disposed in the positive voltage conversion apparatus; and
  a second control circuit disposed in the negative voltage conversion apparatus, and
controlling, by the controller when detecting that the neutral wire current is greater than $I_{t2}$, the positive voltage conversion apparatus and the negative voltage conversion apparatus to increase the voltage difference between the output voltage of the positive voltage conversion apparatus and the output voltage of the negative voltage conversion apparatus when the output power remains unchanged comprises:
  when it is detected that the neutral wire current is greater than $I_{t2}$, controlling, by the first control circuit, the positive voltage conversion apparatus to increase the output voltage; and
  when it is detected that the neutral wire current is greater than $I_{t2}$, controlling, by the second control circuit, the negative voltage conversion apparatus to decrease the output voltage.

15. The method according to claim 13, wherein:
the controller comprises:
  a first control circuit disposed in the positive voltage conversion apparatus; and
  a second control circuit disposed in the negative voltage conversion apparatus, and
controlling, by the controller when detecting that the neutral wire current is greater than $I_{t2}$, the positive voltage conversion apparatus and the negative voltage conversion apparatus to increase the voltage difference between the output voltage of the positive voltage conversion apparatus and the output voltage of the negative voltage conversion apparatus when the output power remains unchanged comprises:
  when it is detected that the neutral wire current is greater than $I_{t2}$, controlling, by the first control circuit, the positive voltage conversion apparatus to increase the output voltage; and
  when it is detected that the neutral wire current is greater than $I_{t2}$, controlling, by the second control circuit, the output voltage of the negative voltage conversion apparatus to remain unchanged.

16. The method according to claim 13, wherein:
the controller comprises:
  a first control circuit disposed in the positive voltage conversion apparatus; and
  a second control circuit disposed in the negative voltage conversion apparatus, and
controlling, by the controller when detecting that the neutral wire current is greater than $I_{t2}$, the positive voltage conversion apparatus and the negative voltage conversion apparatus to increase the voltage difference between the output voltage of the positive voltage conversion apparatus and the output voltage of the negative voltage conversion apparatus when the output power remains unchanged comprises:
  when it is detected that the neutral wire current is greater than $I_{t2}$, controlling, by the first control circuit, the output voltage of the positive voltage conversion apparatus to remain unchanged; and
  when it is detected that the neutral wire current is greater than $I_{t2}$, controlling, by the second control circuit, the negative voltage conversion apparatus to decrease the output voltage.

17. The method according to claim 13, wherein the method further comprises:
determining, by the controller, whether the output voltage of the positive voltage conversion apparatus is greater than a first preset voltage threshold, wherein the first preset voltage threshold is an adjustable upper limit value of the output voltage of the positive voltage conversion apparatus; and
controlling, by the controller, the positive voltage conversion apparatus and the negative voltage conversion apparatus to increase the voltage difference between the output voltage of the positive voltage conversion apparatus and the output voltage of the negative voltage conversion apparatus when the output power remains unchanged comprises:
  when the neutral wire current is greater than $I_{t2}$, and the output voltage of the positive voltage conversion apparatus is less than the first preset voltage threshold, controlling, by the controller, the positive voltage conversion apparatus and the negative voltage conversion apparatus to increase the voltage difference between the output voltage of the positive voltage conversion apparatus and the output voltage of the negative voltage conversion apparatus when the output power remains unchanged, so that the neutral wire current falls within the preset current range $[-I_{t1}, I_{t2}]$; or
the method further comprises:
  when the neutral wire current is greater than $I_{t2}$, and the output voltage of the positive voltage conversion apparatus is greater than or equal to the first preset voltage threshold, controlling, by the controller, the positive voltage conversion apparatus to decrease the output power.

18. The method according to claim 12, wherein:
the preset current range is $[-I_{t1}, I_{t2}]$,
$-I_{t1}$ represents a first preset current threshold,
$I_{t2}$ represents a second preset current threshold,
a direction of the neutral wire current is from the inverter circuit to the voltage conversion circuit,
a positive direction of the current range is from the inverter circuit to the voltage conversion circuit,
a negative direction of the current range is from the voltage conversion circuit to the inverter circuit; and
controlling, by the controller when the neutral wire current does not meet the preset current range, the positive voltage conversion apparatus and the negative voltage conversion apparatus to change the output voltages when the output power remains unchanged comprises:

determining, by the controller, that the neutral wire current is less than $-I_{t1}$; and controlling, by the controller, the positive voltage conversion apparatus and the negative voltage conversion apparatus to decrease a voltage difference between an output voltage of the positive voltage conversion apparatus and an output voltage of the negative voltage conversion apparatus when the output power remains unchanged, so that the neutral wire current falls within the preset current range $[-I_{t1}, I_{t2}]$.

19. The method according to claim 18, wherein:

the controller comprises:

a first control circuit disposed in the positive voltage conversion apparatus; and a second control circuit disposed in the negative voltage conversion apparatus, and controlling, by the controller when detecting that the neutral wire current is less than $-I_{t1}$, the positive voltage conversion apparatus and the negative voltage conversion apparatus to decrease the voltage difference between the output voltage of the positive voltage conversion apparatus and the output voltage of the negative voltage conversion apparatus when the output power remains unchanged comprises:

when it is detected that the neutral wire current is less than $-I_{t1}$, controlling, by the first control circuit, the positive voltage conversion apparatus to decrease the output voltage; and when it is detected that the neutral wire current is less than $-I_{t1}$, controlling, by the second control circuit, the negative voltage conversion apparatus to increase the output voltage.

20. The method according to claim 18, wherein:

the controller comprises:

a first control circuit disposed in the positive voltage conversion apparatus; and a second control circuit disposed in the negative voltage conversion apparatus, and controlling, by the controller when detecting that the neutral wire current is less than $-I_{t1}$, the positive voltage conversion apparatus and the negative voltage conversion apparatus to decrease the voltage difference between the output voltage of the positive voltage conversion apparatus and the output voltage of the negative voltage conversion apparatus when the output power remains unchanged comprises:

when it is detected that the neutral wire current is less than $-I_{t1}$, controlling, by the first control circuit, the positive voltage conversion apparatus to decrease the output voltage; and when it is detected that the neutral wire current is less than $-I_{t1}$, controlling, by the second control circuit, the output voltage of the negative voltage conversion apparatus to remain unchanged.

* * * * *